(12) United States Patent
Komori et al.

(10) Patent No.: US 6,336,006 B2
(45) Date of Patent: Jan. 1, 2002

(54) MAGNETICALLY RECORDABLE PHOTOGRAPHIC FILM, RECORDING METHOD AND SYSTEM THEREFOR AND CAMERA-LABORATORY SYSTEM

(75) Inventors: Noboru Komori; Yoshiaki Kato; Satoshi Yoshida, all of Minami-Ashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/774,636

(22) Filed: Feb. 1, 2001

Related U.S. Application Data

(62) Division of application No. 08/897,978, filed on Jul. 21, 1997, now Pat. No. 6,201,934, and a division of application No. 08/633,555, filed on Apr. 17, 1996, now Pat. No. 5,835,802, which is a division of application No. 08/419,526, filed on Apr. 10, 1995, now abandoned, which is a continuation of application No. 08/195,842, filed on Feb. 14, 1994, now abandoned, which is a continuation of application No. 07/760,000, filed on Sep. 13, 1991, now abandoned.

(30) Foreign Application Priority Data

| Sep. 14, 1990 | (JP) | 2-242796 |
|---|---|---|
| Sep. 14, 1990 | (JP) | 2-242797 |
| Sep. 14, 1990 | (JP) | 2-242798 |
| Sep. 14, 1990 | (JP) | 2-242799 |
| Sep. 14, 1990 | (JP) | 2-242800 |

(51) Int. Cl.[7] .................................................. G03B 17/24
(52) U.S. Cl. ........................ 396/319; 396/311; 355/40
(58) Field of Search ................... 396/311, 319, 396/320; 355/40

(56) References Cited

U.S. PATENT DOCUMENTS

| 4,783,674 A | 11/1988 | Ishikawa et al. |
|---|---|---|
| 4,860,037 A | 8/1989 | Harvey |
| 4,965,626 A | 10/1990 | Robinson et al. |
| 5,001,728 A | 3/1991 | Fuldner |
| 5,006,873 A * | 4/1991 | Wash .......................... 396/319 |
| 5,130,728 A | 7/1992 | Goto et al. |
| 5,231,451 A | 7/1993 | Uekasa et al. |
| 5,255,031 A * | 10/1993 | Ikenoue ....................... 396/319 |

FOREIGN PATENT DOCUMENTS

| EP | 0346777 A1 | 12/1989 |
|---|---|---|
| EP | WO9004290 | 4/1990 |
| WO | 8904362 | 10/1989 |
| WO | WO9004253 | 4/1990 |

OTHER PUBLICATIONS

"Rethinking the 35 mm Cartridge", by L. Andrew Manneheim, The British Journal of Photography, Dec. 21, 1979, pp. 1232–1235.

* cited by examiner

Primary Examiner—Alan A. Mathews

(57) ABSTRACT

A magnetically recordable photographic film has perforations each being in at least one side edge region of the film lying between adjacent image areas (frames). A magnetic recording track region extends throughout the overall length of the side edge region adjacent to each frame in at least one side edge of the film. Camera information is recorded on the side edge track region. Information is read and rewrote on the film in camera. Film information is recorded on the leading end of film, and recording extension may be provided additionally. The film information is read and recorded on the film for each of the frames. Signals for clock and data are based on three-bit encoded data, and a pulse period can be varied depending on film transport speed. Such signals may be selected to have a frequency corresponding to the film transport speed.

10 Claims, 17 Drawing Sheets

MAGNETICALLY RECORDABLE PHOTOGRAPHIC FILM, RECORDING METHOD AND SYSTEM THEREFOR AND CAMERA-LABORATORY SYSTEM

CROSS-REFERENCE TO RELATED APPLICATIONS

This application is a divisional of application Ser. No. 08/897,978, filed on Jul. 21, 1997, now U.S. Pat. No. 6,201,934 filed Feb. 14, 1999 and a Rule 60 Divisional of Ser. No. 08/633,555 filed Apr. 17, 1996 now U.S. Pat. No. 5,835,802, which is a Rule 62 Divisional of Ser. No. 08/419,526 filed Apr. 10, 1995, now abandoned, which is a Rule 62 Continuation of Ser. No. 08/195,842, now abandoned which is Rule 62 Continuation of Ser. No. 07/760,000 filed Sep. 13, 1991, now abandoned; the entire contents of which are hereby incorporated by reference and for which priority is claimed under 35 U.S.C. §120; and this application claims priority of application Ser. Nos. 2-242796; 2-242797; 2-242798; 2-242799; and 2-242800 all filed in Japan on Sep. 14, 1990 under 35 U.S.C. §119.

FIELD OF THE INVENTION

This invention relates to a magnetically recordable photographic film, a recording method and a recording system employing the photographic film, and a camera laboratory system employing the photographic film. The invention encompasses the following first to fifth embodiments.

This invention relates, in the first embodiment, to disposition of a perforation relative to an information recording region of a photographic film having a transparent magnetic recording layer.

This invention relates, in the second embodiment, to a photographic film having a transparent magnetic recording layer, a recording method and a recording system for recording on the photographic film and, above all, to a relation between the photographic film and the perforation in the photographic film and to a recording system especially for camera information.

This invention relates, in the third embodiment, to a recording method for a photographic film provided with a transparent magnetic recording layer, and a photographic film used in the recording method and more particularly to recording of film information.

This invention relates, in the fourth embodiment, to camera and laboratory system and, more particularly, to a camera systems having a magnetic device for magnetic recording by to clock signals in response to the relation between the clock signals and data signals, and to the relation between the pulse frequency and the film transport speed.

This invention relates, in the fifth embodiment, to a camera system and, more particularly, to a camera systems having a magnetic device for magnetic recording.

RELATED ART

The related art for the first to fifth embodiments of the invention is summarized as follows.
Related Art in the First Embodiment A photographic film having a transparent magnetic recording layer has been disclosed in international patent applications having international filing numbers PCT/US 89/04367 and PCT/US 89/04362 and laid open to public inspection internationally (now WO 90/04214 and WO 90/04253). These international patent applications disclose disposition of information recording regions on a photographic film, as shown herein in FIG. 23. FIG. 23 shows, in a front view, a conventional photographic film 100 disclosed in the above referenced international applications. A perforation 125 is formed in a region A defined by a long side 1 of a rectangular photosensitive image area defined by a double-dotted chain line, i.e., frame, and extensions of two short sides m and n of the frame adjacent to the long side 1, that is, in a laterally peripheral region of the frame. Meanwhile C0 to C3 and F00 to F29 represent magnetic recording tracks.
Related Art in the Second Embodiment A photographic film having a transparent recording layer is disclosed in international applications filed under international application numbers PCT/US 89/04367 and PCT/US 89/04362 and laid open to public inspection internationally (now WO 90/04214 and WO 90/04253). In these international applications, a pattern of disposition of information recording regions on a photographic film, as shown herein in FIG. 23, is disclosed. In this figure, there is shown in a front view a conventional photographic film 100 which is disclosed in the above identified international applications, and which includes magnetic recording tracks C0 to C3 and F00 to F29, a photosensitive image area (i.e., frame), defined by a double-dotted chain line, and a perforation 125. It is stated in the specification of each of the international applications that information may be recorded on the magnetically recordable tracks C0 to C3 by a camera capable of effecting magnetic recording.

There has hitherto been proposed a camera system or a laboratory system in which communication of information between a camera user, a film dealer and a photofinisher or developing laboratory, as well as supervision of information such as supervision of users' names in the photofinisher, is enabled by magnetic recording on a continuous film.

Such a camera system is disclosed in an international publication WO 90/04253. With the camera system disclosed in this international publication WO 90/04253, when recording the information to be transmitted or supervised as magnetic recording on the continuous film, recording tracks each specifically dedicated to the camera users, film dealers and the photofinishers, respectively are provided in separate portions on the continuous film. On each track, clock signals and data signals are formed as unitary pulse trains in the form of three-bit encoded data (so called "Tri-bit code").

The waveform of the three-bit encoded data disclosed in the above international publications is shown herein in FIG. 24, in which rising transition pulse flanks P1A and P2A in each of the rectangular pulses correspond to clock signals prescribing a period t of signals to be recorded. If a pulse width td, which indicates the time since the rising transition pulse flank P1A until the next falling transition pulse flank P1B, is expressed by td=t/3, as shown in FIG. 24(a), the data signal is a binary signal having a logical level of 0. If the pulse width td is expressed by td=2 t/3, the data signal is a binary signal having a logical level of 1.

The waveform of reproduced signals, which are the magnetic recordings made by the signals shown in FIG. 24 and reproduced by a magnetic head, is shown in FIG. 25. In the reproduced signals shown in FIGS. 25(a) and (b), positive peak pulses Q1A, Q2A are produced at time points corresponding to the clock signals, while a negative peak pulse Q1B is produced at a time point corresponding to the data signal. The logical levels of 0 or 1 are determined in dependence upon which of the positive peak pulses Q1A and Q2A lying before and after the negative peak pulse Q1B is closer to the peak pulse Q1B. With the three-bit encoded data, since the clock signals and the data signals are recorded on the same track, the recordings may be transmitted mutually between the user, film dealer and photofinisher despite differences in the film feed speeds between the magnetic devices or the film feed speeds at the camera system, film dealers and the photofinishers. Even when the continuous film is fed in the opposite direction to the recording direction, signals may be deciphered by reference to signal data constituted by bits which are complements to the bits of the three-bit data.

Related Art of the Third Embodiment

There has hitherto been proposed a camera system or a laboratory system in which communication of information between a camera user, a film dealer and a photofinisher or developing laboratory, as well as supervision of information such as supervision of users' names in the photofinisher, is enabled by magnetic recording on a continuous film, as discussed in connection with the second embodiment mentioned herein above.

Such a camera system is disclosed in PCT international publications WO 90/04253 and WO 90/04214. On each track, clock signals and data signals are formed as unitary pulse trains in the form of three-bit encoded data (so-called Tri-bit code). An explanation for the Tri-bit code signals has been substantially given in connection with the above mentioned second embodiment.

Related Art for the Fourth Embodiment

The related art for the fourth embodiment is as mentioned in connected with the second and the third embodiments and hence the description therefor is omitted.

Related Art for the Fifth Embodiment

The related art for the fifth embodiments is as mentioned in connection with the second and third embodiments and hence the description is similarly omitted.

DISCUSSION OF THE RELATED ART

Problems to be Solved by the Invention

The followings are problems to be sovled by the present invention in its first to fifth embodiment.

Problem to be Solved by the First Embodiment

If the perforation is provided in the region defined laterally of each frame, limitations are imposed for a given film width on the lengths of the magnetic recording tracks within the region defined laterally of a given frame. On the other hand, even if the distance between the frames is increased for augmenting a magnetically recordable region, a sufficiently long continuous magnetic recording track region cannot be provided along the film length in the side edge region of the film in which the perforation is disposed.

It is an object of the first embodiment of the present invention to overcome the above mentioned problems of the known film and to provide a photographic film which may be simultaneously used for magnetic recording, and a recording method therefor.

Problem to be Solved by the Second Embodiment

When recording is made on the magnetic recording tracks C2 and C3, the magnetic head may be impinged against or caught by the edge or end face of the perforation to cause wear or defects to the head. In addition, fluctuation in the film feed speed is produced to lower the reliability of the recorded information. This tendency becomes more pronounced when the photographic film is projected towards the magnetic head in the vicinity of the perforation. It is moreover not desirable to provide recording tracks on the magnetic layer within the photosensitive image area (frame) for recording because flaws tend to be produced due to sliding contact with the magnetic head. Besides, the film feed (or transport) speed within the camera is changed at the outset and at the end of takeup by a factor of two or more times, while being also changed with the type of cameras, the degree of consumption of the batteries or in dependence upon whether the film is taken up automatically, that is electrically, or manually. Despite the fact that the film feed speed is subject to changes or fluctuations, it is required to record as much information as possible with high reliability.

However, when writing in the camera is performed by a method of recording the clock signals and data signals on a track as a unitary pulse train in accordance with clocks of a predetermined period and with the above mentioned Tri-bit code system, considerable limitations are placed on the amount of the information that may be recorded on a recording track associated with a frame length. Further limitations are imposed for taking the allowances into account. The variable nature and fluctuations in the film feed speed may worsen the instability of the recording signals inclusive of the clock signals. This in turn increases the load on devices used at tile photofinisher for reading out the recorded signals. Therefore, this problem also needs to be solved for realizing a magnetic recording system for the photographic film.

It is an object of the second embodiment of the present invention to provide a photographic film and a recording method and system therefor which is free from these inconveniences.

Problem to be Solved by the Third Embodiment

There is no disclosure in the aforementioned publications as to the film region along its entire length in which to properly record the information to the film.

On the other hand, the film transport speed used in general in a camera system or in a laboratory system used in a photofinisher is changed not only from a camera system or a laboratory system to another, but with one and the same camera. That is, since the rotational speed of a film take-up shaft is usually selected on each camera system to a constant value, the film transport speed at the take-up start differs from that at the film take-up end with a ratio of, e.g., 1:3. In addition, the film transport speed is naturally changed with the degree of battery consumption during film take-up.

With the playback signal in the above described Tri-bit code system, since the logical level of 0 or 1 is determined in dependence upon which of the positive peak pulses Q1A and Q2A corresponding to the clock signals is closer to the negative peak pulse Q1B corresponding to the data signals, disposed therebetween, there is a risk of data misreading if the film feed speed is fluctuated by some reason or other between a temporally preceding clock signal and a temporally succeeding clock signal by more than a predetermined amount.

For this reason, there is a risk for the film information, such as film sensitivity, to be misread, in which case photographing is made by a camera on the basis of the misread information, if the camera is of the automatic type.

It is an object of the third embodiments of the present invention to provide a recording method for a magnetically recordable photographic film which is free of the above mentioned problem of the known method, and a photographic film used in the recording method.

Problem to be Solved by the Fourth Embodiment

It is known in general that film transport speeds used at different camera systems or different laboratory systems at developing laboratories differ not only from one camera system or laboratory system to another, but with one and the same camera. That is, since the rotational speed of a film takeup shaft is usually selected to be constant at each camera system, the film feed speed is changed at the takoup start time and at the takoup end time by a ratio of, e.g., 1:3. In addition, the film feed speed is naturally changed with the different degree of battery consumption during film takeup.

With the playback signals in the above described Tri-bit code system, in which the logical level of 0 or 1 is determined in dependence upon which of the positive peak pulses Q1A and Q1B corresponding to the clock signals lying before and after the negative peak pulse Q1B corresponding to the data signal lying closer to the negative peak pulse Q1B, as discussed previously, there is a risk of data misreading if the film transport speed is changed by more than a predetermined amount by some reason or other between a proceeding clock signal and a succeeding clock signal.

On the other hand, since the film transport speed differs by a factor of three times between that at the start of film takeup and that at the end of film takoup, it may occur that, if the recording density should be lowered significantly, the amount of the recording region on the track might be less than the amount of the information to be recorded in each frame. In such case, the frequency of the clock signals cannot be increased for eliminating the problem of shortage of the recording region without producing a problem in connection with the relation with frequency characteristics of the magnetic material employed in the magnetic head.

In view of the above described status of the known systems, it is an object of the fourth embodiment of the present invention to improve the above described conventional camera-laboratory system having the magnetic device for magnetic recording and to provide a camera system which is provided with a magnetic device less subject to errors in signals transmitted between the camera system and the laboratory system despite occasional fluctuations in the film transport speed.

It is another object of the fourth embodiment of the present invention to provide a camera-laboratory system in which a predetermined amount of a recording region may be assured despite fluctuations in the film transport speed as described above and in which a certain operational reliability may be assured for conformity to the frequency characteristics of a magnetic material of the magnetic head.

Problem to be Solved by the Fifth Embodiment

In the recording system by the three-bit encoded data, as disclosed in the above international publication, clock signals and data signals are recorded as a pulse train on one and the same track. Since the camera data usually include data for photographing conditions, such as date and place of photographing and a light stop value, these clock and data signals are naturally recorded during film transport operation which should take place after light exposure of the film.

However, if the totality of data to be recorded by the camera system should be recorded during the film transport operation following the light exposure, the data to be recorded would become voluminous such that it would become necessary to simultaneously consider the film transport speed and the ability of the microprocessor as well as the buffer capacity and frequency characteristics of the magnetic device. However, the corresponding explanation has not been made in the above international publication. For example, the film transport speed in the camera system is low and unstable, such that, in the above described three-bit encoded data system, a problem is raised in that the recording density needs to be set to an extremely low value if it is desired to assure data reliability.

It should also be noted that, after photographing in all of the frames of a continuous film, the film is usually brought to a film dealer or the like for developing the film and printing the frames. If a film loaded on a camera and exposed to light only halfway of its length could be taken out and loaded on another camera, that is, if unexposed film portions could be used up effectively by re-loading the film on another camera so that photographing may be continued, there is no necessity of photographing unnecessary frames in the remaining film portion to make haste for developing film portions already photographed by the first camera, so that it becomes possible to prevent film loss due to unnecessary photographing and wasteful printing. However, there has not been proposed a camera system designed for light exposure of one film by two cameras. In short, the conventional camera system lacks in the degree of freedom as to the photographing sequence which might allow for photographing with frame skipping or photographing of a given image in a particular frame bearing a desired frame number.

It is an object of the fifth embodiment of the present invention to provide a camera system provided with a magnetic device for magnetic recording, in which timing for recording magnetic signals on a continuous film is set so as to enable magnetic recording with a sufficiently high recording density at an appropriate film transport speed for the camera system in use within the performance range of the microprocessor, the buffer and the magnetic device of the camera system.

It is another object of the fifth embodiment of the present invention to provide a camera system having a high degree of freedom as to the particular frames for photographing and the photographing sequence, such as by enabling a continuous film to be exposed to light on two or more camera systems.

SUMMARY OF THE DISCLOSURE

Means to Solve the Problem

The following are means for overcoming the problems of the first to fifth embodiments of the invention.

Means to Solve the Problem of the First Embodiment

According to the present invention, the above object in the first embodiment may be accomplished by the following photographic film on which magnetic recording may be made and the recording method therefor.

(1-1) A photographic film on which magnetic recording may be made comprising a film base, a photosensitive layer, and a magnetically recordable transparent magnetic layer, including a perforation being disposed in at least one side edge region of the photographic film lying between adjacent ones of a series of photosensitive image areas on the photographic film, and a magnetic recording track region extending throughout the overall length of the side edge region of the photographic film adjacent to said image area being provided at at least one side edge of the photographic film.

(1-2) A recording method for a photographic film according to above (1-1) on which magnetic recording may be made, comprising the step of magnetically recording information on said magnetically recordable transparent magnetic layer.

Means to Solve the Problem of the Second Aspect

According to the present invention, the above object in the second embodiment of the present invention may be accomplished by the following method for recording on a magnetically recordable photographic film, the recording method and the recording system therefor.

(2-1) A method for recording on a magnetically recordable photographic film comprising a magnetically recordable transparent magnetic layer, said photographic film having perforations only on one side edge thereof, said method comprising the step of recording information by magnetic recording means provided on a camera only on the side edge of the photographic film devoid of the perforations.

(2-2) A magnetically recordable photographic film comprising a film base, a photosensitive layer, and a magnetically recordable transparent magnetic layer, wherein camera information is recorded in a camera only on a side edge of the film devoid of perforations.

(2-3) A magnetically recordable photographic film according to (2-2) in which perforations are provided only on one side of the side edge of the film and in which only the side edge of the film free of the perforations is used as a magnetically recordable track area on which to record the camera information.

(2-4) A recording system for a magnetically recordable photographic film comprising a film base, a photosensitive layer, and a magnetically recordable transparent magnetic layer, said recording system comprising a reading/rewriting device for reading and rewriting information recorded by magnetic recording means provided in a camera.

In the above system, the above information may be rewritten by changing the format.

Rewriting is performed at a recording system provided at the photofinisher and reading as well as rewriting is possible at a constant film feed speed. This renders the recorded information more reliable and stable to improve reliability at the time of subsequent data reading to enable accurate data re-recording for the following reason. The film takeup speed (i.e., film feed or transport speed) in a camera is not necessarily constant but is generally subject to fluctuations due to friction in the film transport system and increases in film takeup bobbin diameter with the progress in the film takeup process. For example, with a constant rotational speed of the takeup bobbin, the film takeup speed is changed gradually from 30 mm/sec to 90 mm/sec using a winder and from 100 mm/sec to 300 mm/sec using a motor drive, as the film takeup process proceeds. For this reason, for reproducing the information recorded by the camera, it is necessary to perform a complex readout processing for accurate reproduction of the recorded information. It would be problematic to incorporate related equipment in the photofinishers and developing lines in the photofinishers. With the recording system of the present embodiment, the above problem may be coped with by rewriting the information in the above described manner. That is, the system of the present invention may be used to rewrite predetermined signals and re-record the rewritten signals on a predetermined recording track under an accurate feeding speed and under predetermined clocks. In this manner, accurate signal recording may be assured and basic data may be constituted for a variety of subsequent processing operations and concomitant additional recording. Preferably the format is changed for rewriting the information. This in turn enables a large quantity of information to be recorded.

According to the present system, the information may be recorded in a compacted form on the predetermined tracks, so that a sufficient amount of data may be recorded only on the recording tracks provided on the side edge of the film which is devoid of perforations, as defined in (2-1), (2-2) and (2-3) above. In addition, further recording regions may be provided for developing and further downstream processing operations.

Means to Solve the Problem of the Third Embodiment

According to the present invention, the object in the third embodiment may be accomplished by the following recording method for the recordable photographic film and to a photographic film therefor.

(3-1) A magnetically recordable photographic film comprising a film base, a photosensitive layer, and a transparent magnetic layer, wherein a set of film information is magnetically recorded on a loading end portion of the film base.

(3-2) A recording method for a magnetically recordable photographic film comprising a magnetically recordable transparent magnetic layer, said method comprising the steps of:

magnetically recording film information on a longitudinal leading end portion of said photographic film, reading said film information, and magnetically recording the read film information on said photographic film.

Preferably, the leading end portion is a lead part of the film.

(3-3) A magnetically recordable photographic film comprising a film base, a photosensitive layer, and a magnetically recordable transparent magnetic layer, wherein a recording extension adjacent to a lead part of the film is provided within a film width.

(3-4) A recording method for a magnetically recordable photographic film comprising a magnetically recordable transparent magnetic layer, said method comprising the step of recording film information for each photosensitive image area of said photographic film.

(3-5) A recording method for a magnetically recordable photographic film comprising A magnetically recordable transparent magnetic layer, said method comprising the step of recording film information on at least two magnetic recording regions of said photographic film.

Operation of the Third Embodiment

First Sub-Embodiment of the Third Embodiment

By magnetically recording the film information on the longitudinal leading end portion of the photographic film, reading the film information and re-recording the read film information on the photographic film, the film information may be recorded efficiently. For example, when a new film is used, the most crucial film information may be reliably and promptly read at the startup of a film take-up operation on loading the film in a camera. After the film is loaded on the camera, the film in its entirety is taken up and the film information may be recorded in a desired amount at desired positions. In addition, since the film information may be recorded a number of times on succeeding film regions based on the film information read at the leading end of the film, the film information may be checked in the course of subsequent photographing by reading the film information thus recorded in the film regions other than in the leading end portion on the frame-by-frame basis.

Second Sub-Embodiment

Since the recording extension is provided adjacent to the lead part of the film within the film width, a sufficient amount of the film information may be recorded in the leading end of the film, while a spare recording region may be provided therein for additional information. In addition, since the same film information can be recorded a number of times, misreading of the film information may be prevented from occurring. The advantage derived from recording the film information in the leading end of the film has been discussed in connection with the first sub-embodiment of the invention.

Third Sub-Embodiment

By recording the film information in each photosensitive image area (frame) of the photographic film, photographing may be made as the film information can be read frame by frame to check for the film information, while photographing may be started at a desired frame in the film to prevent misreading of the film information.

Fourth Sub-Embodiment

By recording film information in at least two magnetic recording regions in the photographic film, it becomes possible to read the film information two or more times at different positions on the film, so that photographing may be made while checking the film information to prevent misreading of the film information. Most effects may be achieved by recording the film information at the longitudinal leading end of the photographic film or its vicinity.

Means to Solve the Problem of the Fourth Embodiment

The above object in the fourth embodiment, in its first sub-embodiment, of the present invention may be accomplished by a camera system to be used with a continuous film which comprises a photosensitive layer for imaging and a magnetic layer for magnetic recording, said camera system comprising a magnetic device for magnetic recording, wherein signals for clock information and data for said magnetic recording are formed as a pulse train each having a pulse period t, said clock signals being each defined by a transition pulse flank from a first level to a second level of each rectangular pulse of said pulse train, and said data signals being each formed of a binary signal defined by selection of a pulse width td beginning with one of said transition pulse flanks, and wherein said pulse period t and the pulse width td are defined as $$0 < td/t \leq 1/4 \text{ or } 3/4 \leq td/t \leq 1$$

in dependence upon a logical level of a binary signal system.

The object of the fourth embodiment of the present invention, in a second sub-embodiment, is also accomplished by a camera system to be used with a continuous film which comprises a photosensitive layer for imaging and a magnetic layer for magnetic recording, said camera system comprising a magnetic device for magnetic recording, wherein signals for clock information and data for said magnetic recording are formed as a pulse train each having a pulse period t.

wherein said pulse period t is variable in dependence upon a film transport speed in the camera system.

The above object, in third or fourth sub-embodiments, may also be accomplished by a camera system to be used with a continuous film which comprises a photosensitive layer for imaging and a magnetic layer for magnetic recording, said camera system comprising a magnetic device for magnetic recording, wherein said continuous film is transported by a winder and a film transport speed ranges between 30 mm/s and 90 mm/s, and wherein said signals for clock information and data for said magnetic recording are formed as a pulse train, and the frequency f of said clock signals is defined as $$50 \text{ Hz} \leq f \leq 4 \text{ kHz:}$$

Also, the present invention may be accomplished by a camera system to be used with a continuous film which comprises a photosensitive layer for imaging and a magnetic layer for magnetic recording, said camera system comprising a magnetic device for magnetic recording, wherein said continuous film is transported by a motor drive and a film transport speed ranges between 100 mm/s and 300 mm/s, and wherein signals for clock information and data for said magnetic recording are arranged as a pulse train, and the frequency f of said clock signals is defined as 150 Hz f 12 kHz.

The above object of the fourth embodiment of the present invention may also be accomplished in a fourth sub-embodiment, by:

a laboratory system to be used with a continuous film which comprises a photosensitive layer for imaging and a magnetic layer for magnetic recording, said camera system comprising a magnetic device for magnetic recording, wherein said continuous film is transported by a motor drive and a film transport speed ranges between 200 mm/s and 500 mm/s, and wherein signals for clock information and data for said magnetic recording are arranged as a pulse train, and the frequency f of said clock signals is defined as $$300 \text{ Hz} \leq f \leq 20 \text{ kHz.}$$

Means to Solve the Problem in the Fifth Embodiment

The above objects of the present invention may be accomplished by a camera system used with a continuous film having a photosensitive layer for imaging and a magnetic layer for magnetic recording, said camera system comprising a magnetic device for magnetic recording, wherein, on loading said continuous film, checking said continuous film and, if magnetic signals fail to have magnetic signals have already been recorded on said continuous film and, if magnetic signals fail to have been recorded, thereon prescribed magnetic signals are recorded on the continuous film during prewinding of the film.

Among the magnetic signals to be recorded during prewinding for initial formatting, there are data not relevant to photographing conditions for each frame, such as, for example, frame number data allocated to each frame, clock signals or data concerning, camera identification number or camera owner code, etc.

Operation of the Fifth Embodiment

By initial formatting upon loading a new film, frame numbers etc. may be set. Also, by previously recording the data irrelevant to photographing conditions during prewinding, the data to be recorded during film transport following light exposure may be reduced in volume. In this manner, the performance of the microprocessor, the buffer or the magnetic device etc. may be selected to be lower than a predetermined range while the film transport speed may be maintained at a speed suitable for the camera system.

By having the frame number, to be allocated to each frame, recorded during the prewinding, it becomes possible to photograph on a desired frame by subsequently designating the frame number at the camera system without obeying the frame arraying sequence on the film. Also it becomes possible to photograph on a film with the use of two or more cameras. As a result, it becomes possible to have a plurality of films having different ASAs loaded alternately in one and the same camera for sequentially photographing at desired frame positions.

Meanwhile, the frame number may be set on the basis of read-out positions of the perforations, or as a function of the prewinding speed, although this complicates the construction of the apparatus to some extent. The latter arrangement may be adopted for a film devoid of perforations or a usual film having a series of perforations.

Initial formatting includes the recording of data, such as clock signals, camera identification numbers, etc. in addition to the above mentioned setting of the frame number and frame positions. During the initial formatting, setting for calculation of light exposure conditions is made within the camera system on the basis of data previously recorded on the film, such as ASA. Although the film used in the camera system of the present embodiment is assumed to be a 35 mm film, this is not limitative of the present invention.

DESCRIPTION OF PREFERRED EMBODIMENTS

The following descriptions are provided for the preferred embodiments in the first to third embodiments of the present invention.

Preferred Embodiments of the First Embodiment

The aforementioned perforation needs to be provided in at least one side edge region of the film lying between neighboring ones of a series of photosensitive image areas i.e., frames on the film. However, if necessary, the perforation may be provided in both side edge regions of the film.

The magnetic recording track region is provided at least throughout an overall transverse length of a side edge region adjacent to the associated frame. If necessary, the magnetic recording track region may reach a boundary zone between the adjoining frames along the film length. If the perforation is provided only at one side edge of the film, it is only sufficient if the magnetic recording track region at the opposite side edge of the film to be of the same length as the first stated magnetic recording track region for the same frame.

A sole magnetic recording track or two or more magnetic recording tracks parallel to one another are formed in the magnetic recording track region(s) in the side edge region(s) associated with a given frame. If necessary, the track(s) may be divided into two sections along the film length.

The magnetic recording track region(s) may also be formed in partial superposition or overlap with the photosensitive image area (frame). However, if a flaw is likely to be produced on contact with a magnetic head, it is desirable to avoid recording on the overlapping region(s) with the frame, provided that sufficient recording may be made in the side edge region(s). If the side edge region(s) is insufficient for recording, it is desirable to make recording on the overlapping track region(s) beginning with those tracks lying closer to the lateral side of the frame. Two or more tracks may be provided parallel to one another along the film length in the magnetic recording track region(s) which overlap the frame. If necessary, these tracks may be divided into two or more sections along the film length.

The photographic film of the present embodiment includes a photosensitive layer on one side of a film base and a magnetically recordable transparent magnetic layer on the other side of the film base. The surface of the transparent magnetic layer may also be coated with a protective layer exhibiting anti-static and lubricating properties.

The transparent magnetic layer needs only to be so transparent that the photographic film of the present embodiment provided with the magnetic layer may be used as a photographic film. It is sufficient if the transparent magnetic layer is formed of a transparent base layer having fine magnetic bodies dispersed at a lower density.

The photographic film of the present embodiment may also be accommodated in a cartridge and loaded in this state in a camera for photographing.

Preferred Embodiments of the Second Embodiment

The information to be recorded on the side edge of the film devoid of perforations by magnetic recording means provided on the camera includes the presence or absence of stroboscopic illumination, the type of light source, the type of lens, day and time of photographing, presence or absence of light exposure, title, film sensitivity, camera used for photographing, photographer, shutter speed, light exposure time, size of diaphragm and the like, which are termed collectively as camera information.

For rewriting the information recorded on the side edge of the film devoid of perforations (camera information), the above information is read using the recording system of the present embodiment and preferably the read information is recorded on the side edge of the film using a constant feed speed such as the film feed speed or the feed speed of the magnetic recording means such as a magnetic head. In this manner, the clock period may be made constant to assure accurate data recording. If the magnetic recording means having an accurate film transport system provided, e.g., at a photofinisher is used, the read-out information may be recorded in a region other than the side edge of the film devoid of perforations. For recording the read-out information in the same region, it is only sufficient to overwrite the recorded information without erasure. The information recorded for rewriting may be the same information as the information recorded in the camera, a selected portion of the information, or the information added with a new piece of information.

Upon rewriting, the format may be changed to one adapted to the recording system at the photofinisher for effecting recording. Sufficient redundancy is required of the recording format for the camera information in the camera because the recording format is prescribed in consideration of diversities of the types of cameras, changes in the feed speeds and fluctuations in the feed speeds. In contrast thereto, a format of a higher density may be set at a high precision recording system for the laboratory.

Thus a sufficient amount of the recording capacity may be maintained even if the region for tracks used for recording is limited to a side edge region or its vicinity.

The format may be changed with respect to tracks designated for specific information, track width, track pitch, track position, the number of recording fields in a track or clocks.

Preferred Embodiments of the Third Embodiment

The film information may be enumerated by, for example, film sensitivity, number of frames, film types, day of production, time limit of use, production number and the like.

First Sub-Embodiment

Magnetic recording of the film information at the longitudinal leading end of the photographic film may be made during the film production process.

Reading of the film information may be made by magnetic recording means, such as a magnetic head, provided in a camera. Rerecording of the read information of the photographic film may be made by, for example, the magnetic head of the camera.

Second Sub-Embodiment

Preferably, the extension for recording is provided so as to be in the area of a size enough to provide a track, along the longitudinal direction of the film, corresponding to a magnetic recording track provided at a side edge adjacent to a frame.

The photographic film of (which can be used in) the present embodiment includes a photosensitive layer formed on one side of the film base and a magnetically recordable transparent magnetic layer formed on the other side of the film base. The surface of the transparent magnetic layer may be coated with a protective layer exhibiting anti-static and lubricating properties.

As for the transparent magnetic layer, it is only sufficient if the transparent magnetic layer is transparent enough to permit the photographic film of the present embodiment to be used as a photographic film. It is also sufficient if the magnetic layer has fine magnetic particles dispersed in a transparent base layer at a lower density.

The photographic film of the present embodiment may be loaded and used in the camera in the state in which it is accommodated in a cartridge.

Third Sub-Embodiment

Recording is preferably made in a magnetic recording region along a side edge (or edges) of the film.

Recording of the film information is made by magnetic recording means, such as a magnetic head, provided in the camera.

The film information may be that obtained upon reading the information recorded at the longitudinal end of the photographic film.

Fourth Sub-Embodiment

Most preferably, recording is made at the longitudinal leading end of the photographic film, and at a side edge of the film adjacent to the first and/or second frame. If necessary, recording may be made frame by frame, in which case recording is made at a side edge of the film adjacent to each frame.

The film information may be recorded by magnetic recording means, such as a magnetic head, provided on the camera.

The film information may be that obtained upon reading the information recorded at the longitudinal leading end of the photographic film.

Meanwhile, the photographic film employed in each of the methods of the present invention is not limited to that of the second embodiment of the invention. The perforation may be provided at one of or both side edges of the film. The perforation may also be provided at a side edge lying between the frames.

BRIEF DESCRIPTION OF THE DRAWINGS

The following is the brief description of the drawings for the First to Fifth Embodiments.

FIGS. 1 to 3 refer to the first aspect of the invention, wherein:

FIG. 1 is a front view showing the disposition of information recording regions on a photographic film according to the first embodiment of the present invention;

FIG. 2 is a schematic view of a camera capable of recording information on the photographic film according to the first embodiment of the present invention; and FIG. 3 is a block diagram of a circuit for determining an image area dedicated to a perforation;

FIG. 4 is a front view of a photographic film used in the recording method of the second embodiment of the present invention, for illustrating disposition of recording information thereon;

FIG. 5 is a schematic view showing a typical camera used in the recording method of the second embodiment of the present invention;

FIG. 6 is a block diagram of a recording system for re recording by a photofinisher; and FIG. 7 is a front view of a photographic film according to a modified embodiment of the present invention FIGS. 8 to 13 refer to the embodiment of the present invention and FIGS. 24 and 25 refer to the prior art;

FIGS. 14 to 18 refer to the fourth embodiment of the present invention and FIGS. 24 and 25 refer to the corresponding prior art;

FIG. 14 is a perspective view showing an embodiment of a camera system according to the present invention;

FIG. 15 is a plan view showing an example of information recording positions on a continuous film used in the camera system of FIG. 14;

FIG. 18 is a graph showing the relation between the wavelength of the signal reproduced from magnetic recordings in general and the rated output;

FIGS. 19 to 22 refer to the fifth embodiment of the present invention, wherein:

FIG. 19 is a perspective view showing an embodiment of a camera system according to the present invention, with a rear cover of the camera opened;

FIG. 20 is a plan view of a continuous film used in the camera system of FIG. 19;

FIG. 21 is a waveform diagram of recording signals applied to a recording head of the camera system shown in FIG. 19; and FIG. 22 is a waveform diagram showing the waveform of signals reproduced by a magnetic head from magnetic signals recorded on the film with the signals shown in FIG. 21;

DETAILED DESCRIPTION OF THE EMBODIMENTS

First Embodiment

Figure 1:
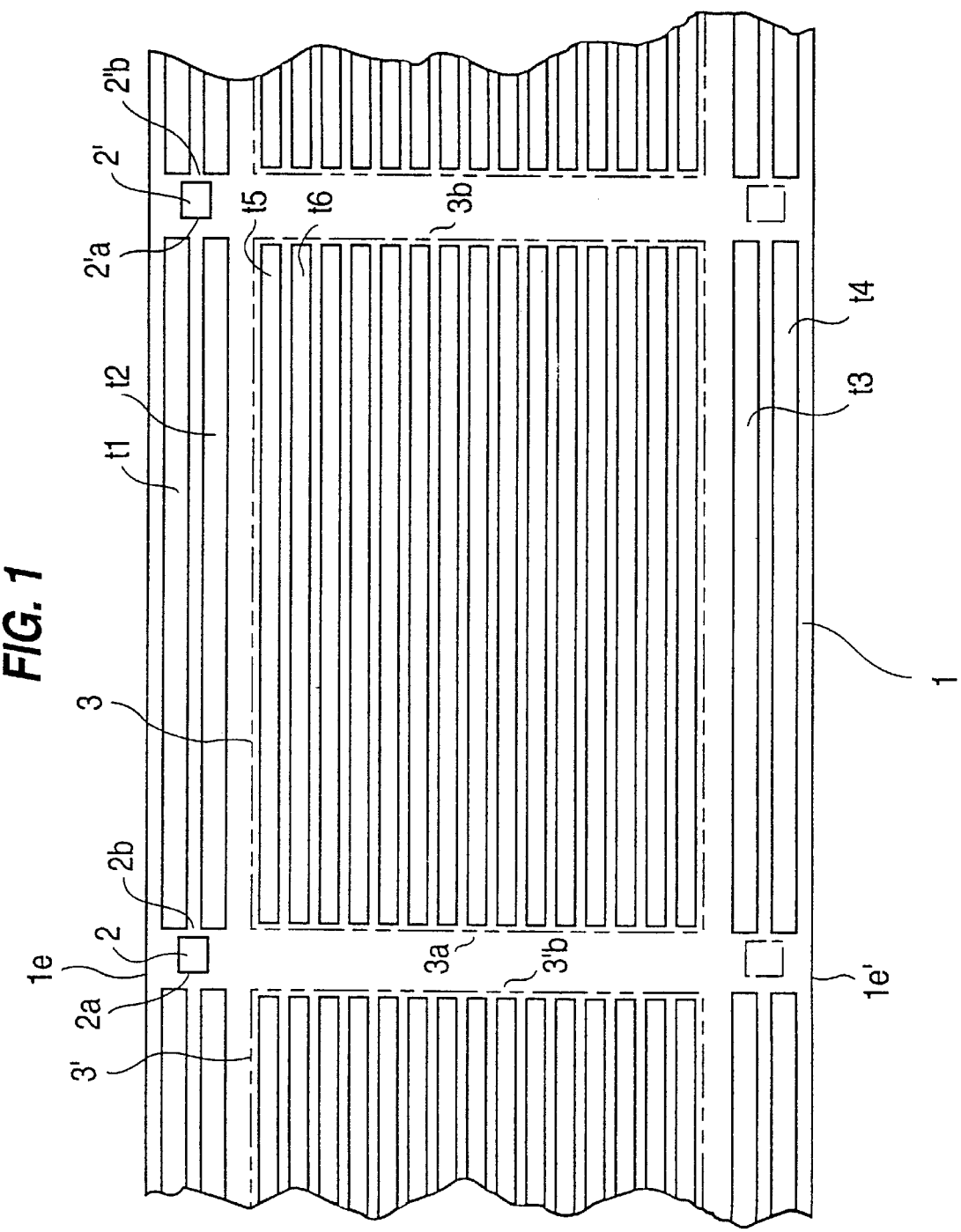

The first embodiment of the present invention will be explained in detail hereinbelow. FIG. 1 shows, in a front view, a photographic film of the present embodiment, for illustrating a pattern of the disposition of information recording region on the film.

A perforation 2 in the photographic film 1 is formed in one side edge region lying between adjacent photosensitive image areas, that is, frames 3, 3' (regions enclosed by a double dotted chain line).

That is, the perforation shown in FIG. 1 is formed at one side edge of the film within a region defined by a short side 3a of the frame 3 parallel to the film width and its extension, a short side 3'b of a frame 3' facing the short side 3a and its extension, and longitudinal sides 1e. 1e' of the photographic film.

Magnetic recording tracks t1 and t2 are formed along the entire length of a side edge region adjacent to a side of the photosensitive image area 3 across the film width, that is, for the length defined by the extensions of the short sides 3a, 3b of the photosensitive image area (frame). Although the track lengths of the magnetic tracks t3, t4 are defined herein between the extensions of the short sides 3a and 3b, the track lengths may be modified as long as the track lengths remain the same for a given frame. For example, the track lengths of the tracks t3 and t4 may be defined between an extension of a side 2a of the perforation 2 and an extension of a side 2'a of an adjacent perforation 2', between an extension of a side 2b of the perforation 2 and an extension of a side 2'b of the perforation 2', or between axes of symmetry of the perforations 2 and 2'.

Meanwhile, a second perforation may also be provided in the other side edge region of the film, as indicated by a chain-dotted line.

Figure 2:
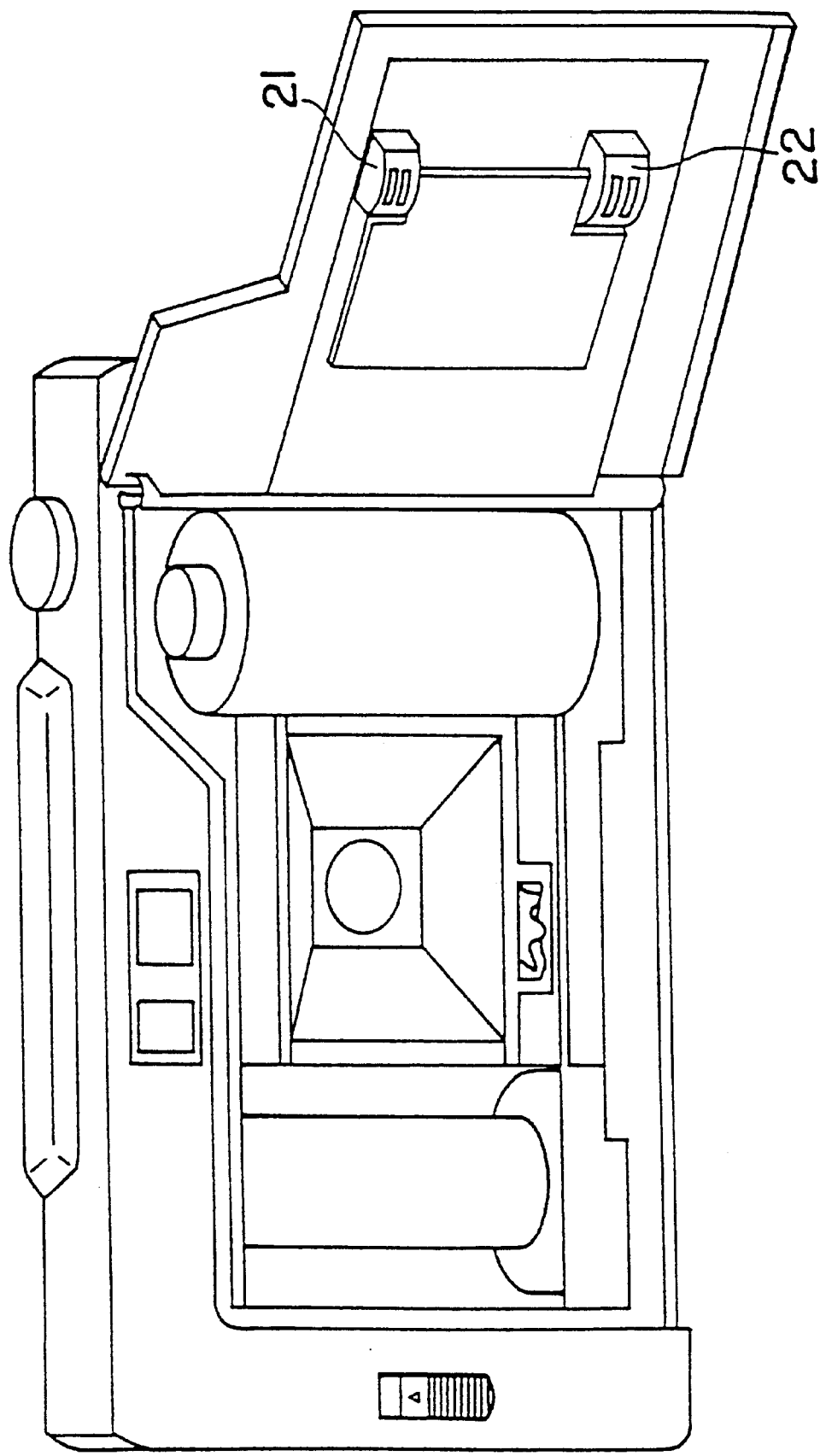

The magnetic tracks t1 to t4 may be those tracks on which information is recorded by a camera when the film is loaded therein. The camera is shown in FIG. 2 and includes magnetic heads 21, 22 adapted for recording the information on the tracks t1, t2 and on the tracks t3, t4, respectively.

Figure 3:
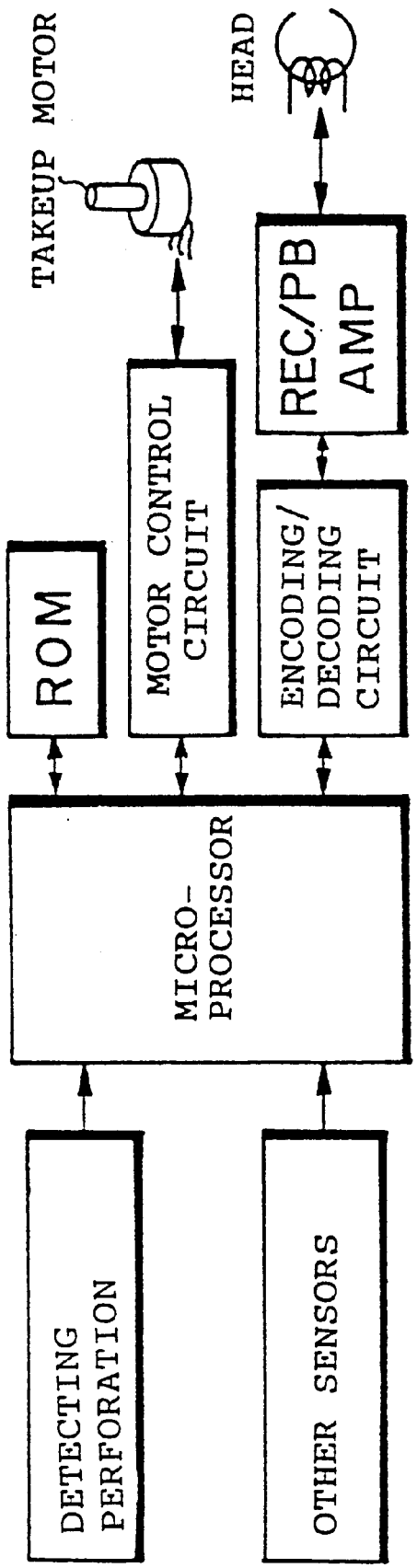

FIG. 3 shows, in a block diagram, a typical circuitry for sensing a perforation to determine a frame associated with the perforation.

The information recorded on the magnetic recording tracks t5 et seq. formed in superposition with the photosensitive image area may be recorded and/or reproduced by a magnetic recording/reproducing means, such as a magnetic head, provided in a developing system at a laboratory or photofinisher so as to be used at the a photofinisher.

Second Embodiment

Referring to the drawings, preferred embodiments of the second embodiment of the present invention will be explained hereinbelow.

Embodiment 2-1

Figure 4:
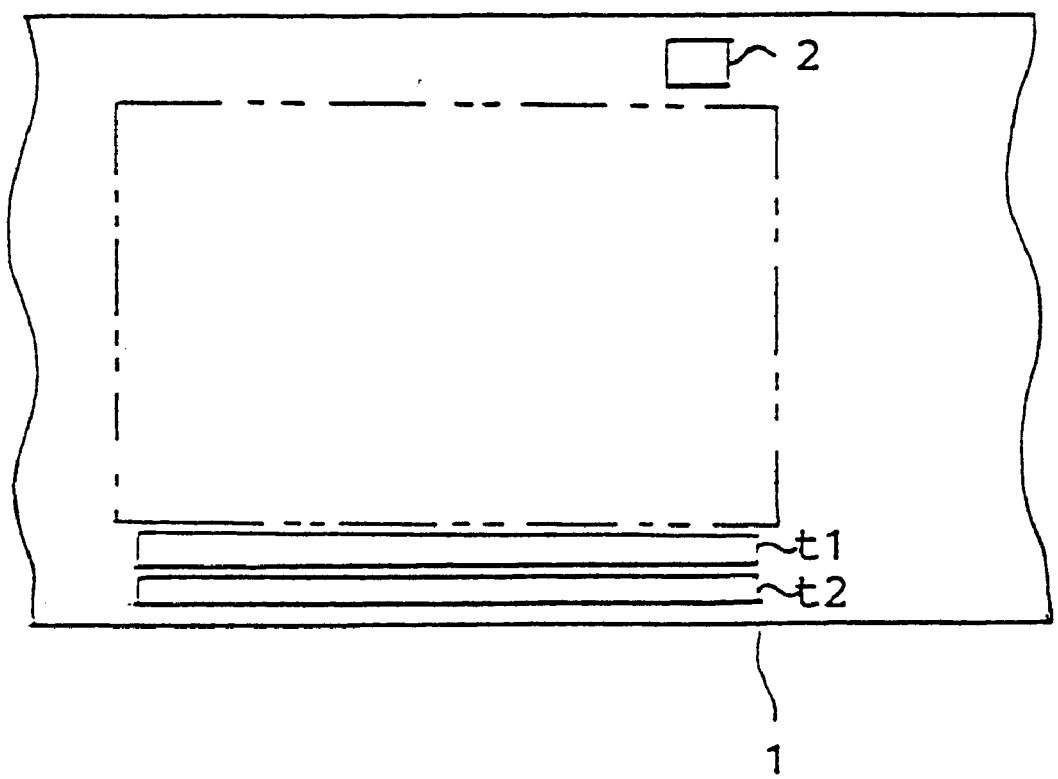
FIGS. 4 to 7 refer to the second embodiment of the invention, and FIGS. 23, 24 and 25 refer to the corresponding prior art.

FIG. 4 is a front view of a photographic film employed in the recording method of the present embodiment, wherein the disposition of recorded information on the film is illustrated.

The photographic film 1 includes a film base, a photosensitive layer provided on one side of the film base, and a magnetically recordable transparent magnetic layer provided on the other side of the film base, wherein a perforation 2 is provided only on one side edge of the film. Recording is made only on magnetic tracks t1 and t2 on the side edge of the film devoid of perforations by a magnetic head 21 provided in a camera shown in FIG. 5.

Embodiment 2-2

Figure 6:
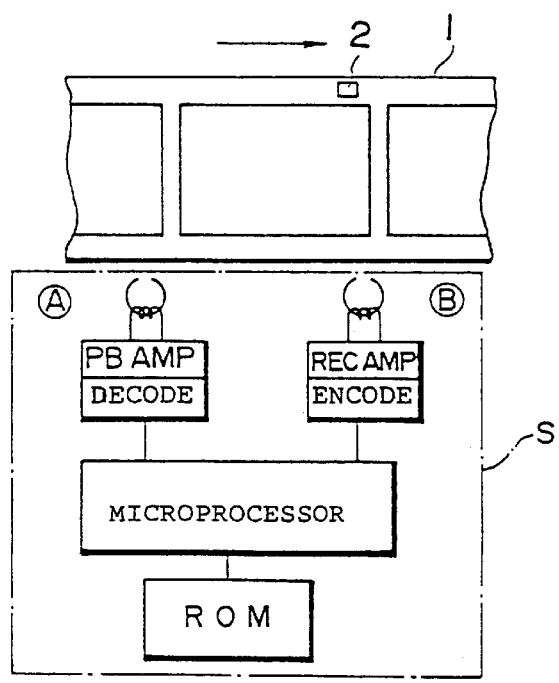

FIG. 6 is a block diagram showing the state of re-recording at a laboratory (or a photofinisher).

The information recorded within the camera on the recording tracks t1 and t2 of the photographic film 1 similar to that used in Example 2-1 is read by a magnetic head A using a recording system S during the time the photographic film 2 is fed into a printer. When the photographic film 1 is fed out of the printer, the read-out information is re-written on the tracks t1 and t2 by the magnetic head B under a constant film feed.

Embodiment 2-3

When the information is rewritten in embodiment 2-2, the clock period is changed, with the corresponding format being initialized at the same time.

Embodiment 2-4

Figure 23:
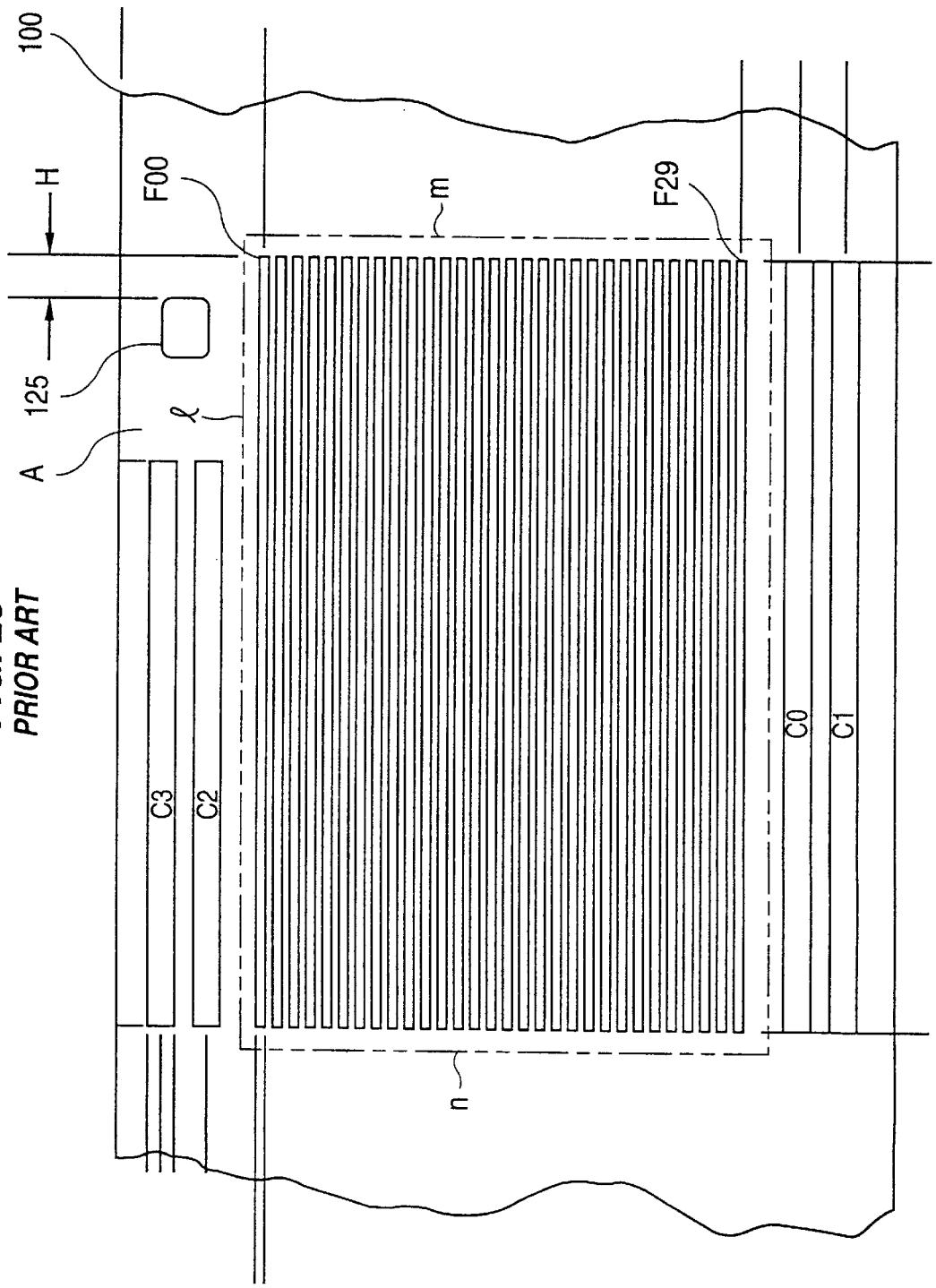
FIG. 23 is a front view showing the disposition of information recording regions on a conventional photographic film.
Figure 24A:
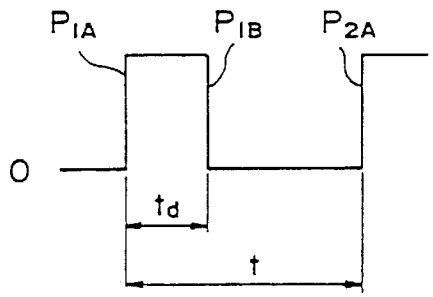
FIGS. 24a and 24b are a waveform diagram of three-bit encoded data signals in a conventional camera system.
Figure 24B:
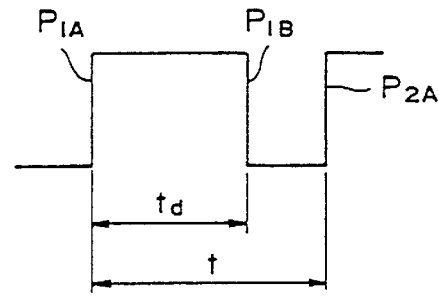
Figure 25A:
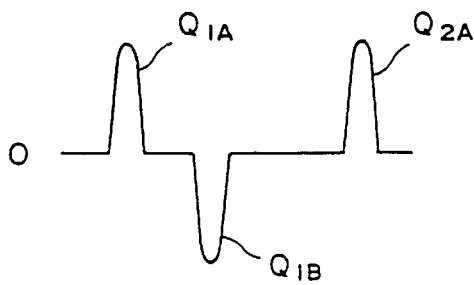
FIGS. 25a and 25b are a waveform diagram showing the waveform of the signals reproduced from the signals shown in FIG. 24.
Figure 25B:
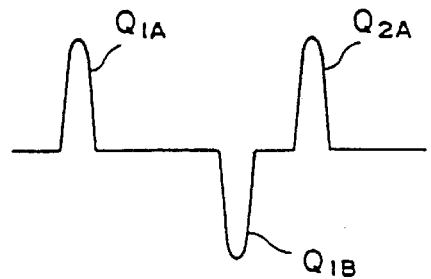

The camera information recorded within the camera on the recording tracks C1 to C3 of FIG. 23 is read by the recording system S and written on the recording tracks C0 and C1 in a compacted state.

Embodiment 2-5

Any of the processing operations of the embodiment 2-1 to 2-4 are carried out before or after the developing operation.

Embodiment 2-6

Any of the processing operations of the embodiments 2-1 to 2-4 are carried out as a continuous process of the process of the developing operation.

Embodiment 2-7

In carrying out the processing operations of the embodiments 2-1 to 2-4, reading is performed before the printing process and writing is performed after the printing process.

Figure 7:
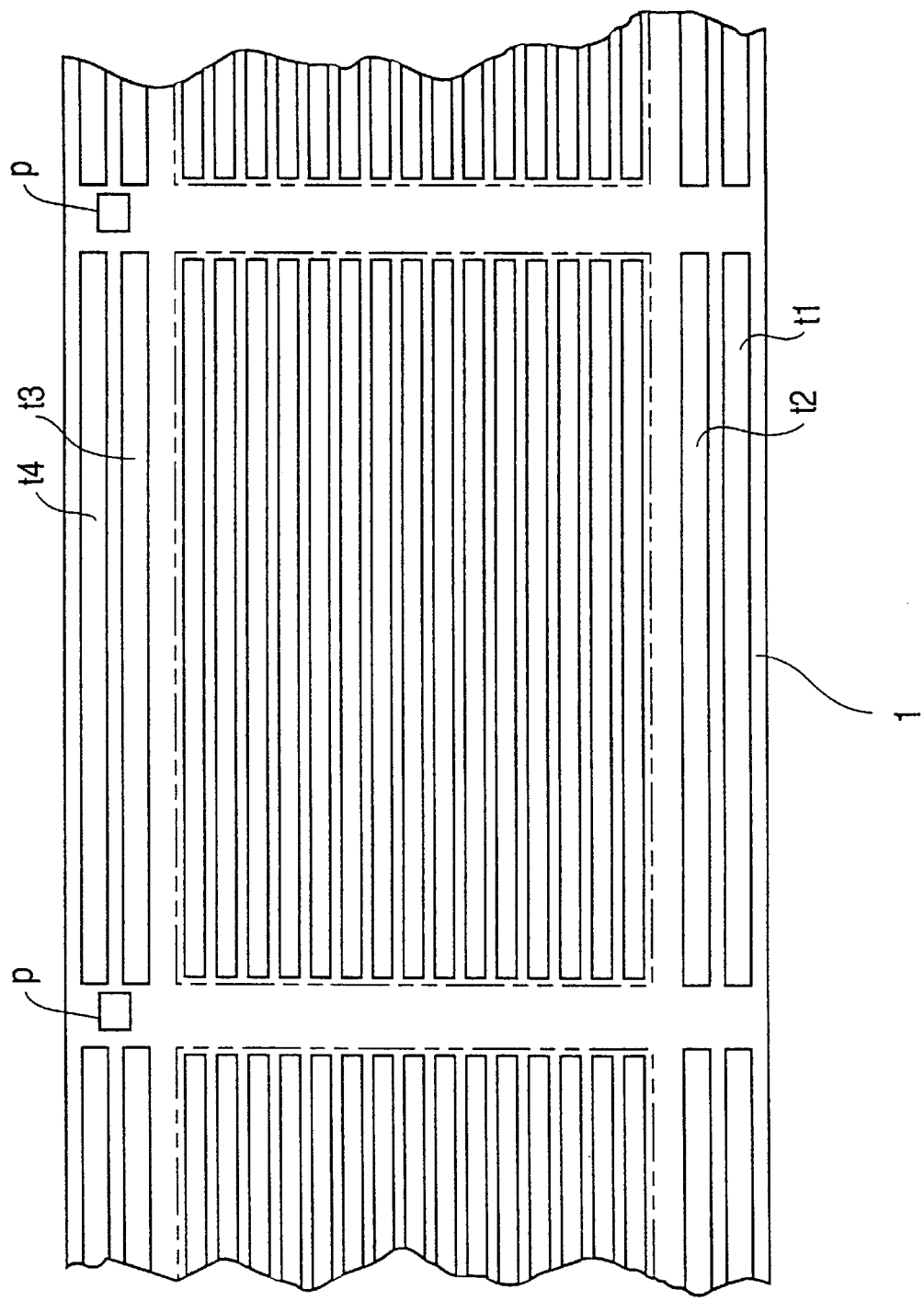

Meanwhile, a photographic film 1 shown in FIG. 7 may be used as the photographic film in the above embodiments. In FIG. 7, t1 to t4 denote magnetic recording tracks and P denotes perforations provided between adjacent photosensitive image areas indicated by double-dotted chain lines.

Third Embodiment

Preferred embodiments of the third embodiment of the invention will be explained by referring to the drawings.

Embodiment 3-1

Figure 8:
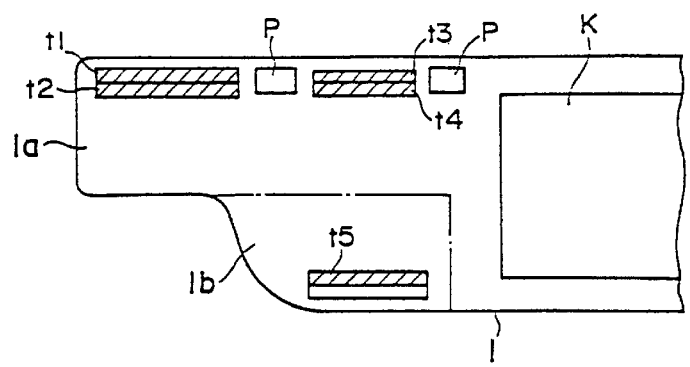
FIG. 8 is a front view showing a recording region of an example of a photographic film according to the third embodiment of the present invention.

FIG. 8 shows, in a front view, recording regions of a photographic film according to the present embodiment wherein a recording extension 1b having a width equal to the film width is provided adjacent to a lead part 1a of the film 1. Meanwhile, P denotes a perforation, and K a frame, in the following embodiments.

Embodiment 3-2

Figure 12:
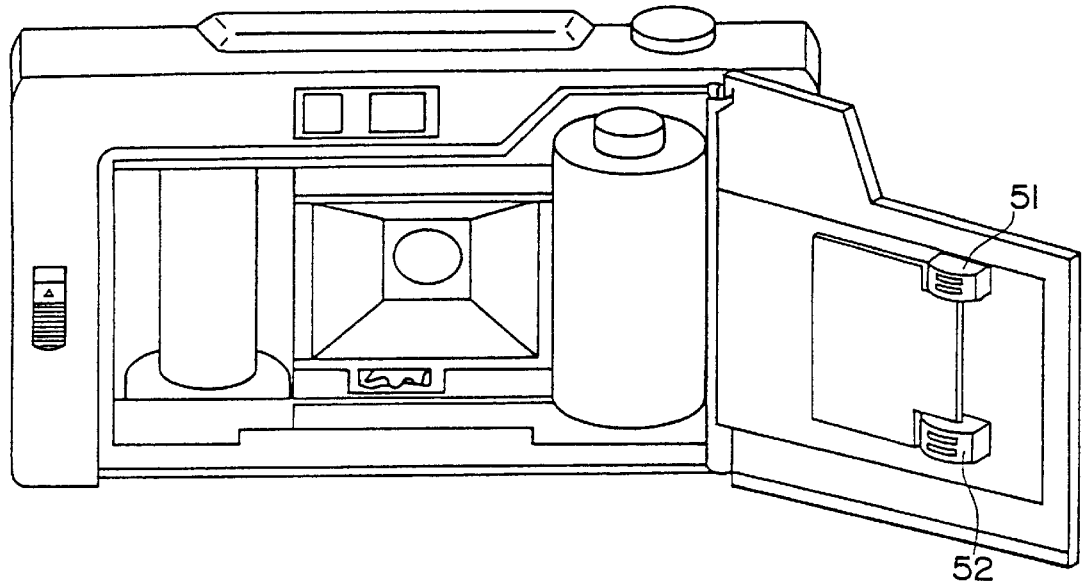
FIG. 12 is a schematic view of a magnetically recording camera.

The film information is magnetically recorded on magnetic tracks t1 to t5 at the longitudinal leading end of the photographic film shown in FIG. 8, and is read by a camera shown in FIG. 12. The read-out film information is magnetically recorded by the camera on the photographic film.

Figure 13:
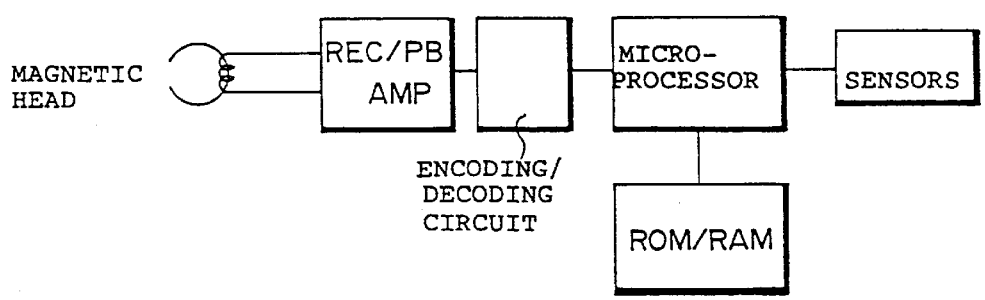
FIG. 13 is a block diagram showing a recording process achieved by the camera shown in FIG. 5.

FIG. 12 is a schematic view of the camera provided with magnetic heads 51, 52 for reading and recording the film information. FIG. 13 is a block diagram for showing the recording process by the camera.

Embodiment 3-3

Figure 9:
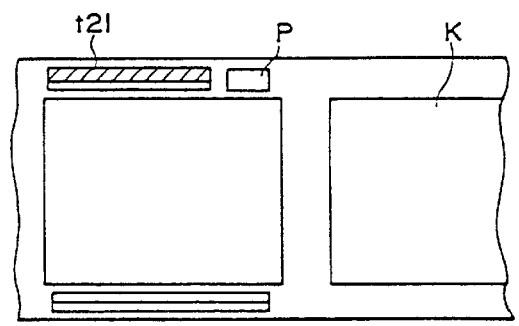
FIG. 9 is a front view showing a recording region of another example of a photographic film according to the third embodiment of the invention.

The film information (the information obtained upon reading, by the above mentioned camera, the film information recorded at the leading end of the film) is recorded by the above camera on a magnetic recording track t21 along the side edge of the film adjacent to the photosensitive image area (frame) of the photographic film similar to the film of the Embodiment 1 (see FIG. 9).

Embodiment 3-4

Figure 10:
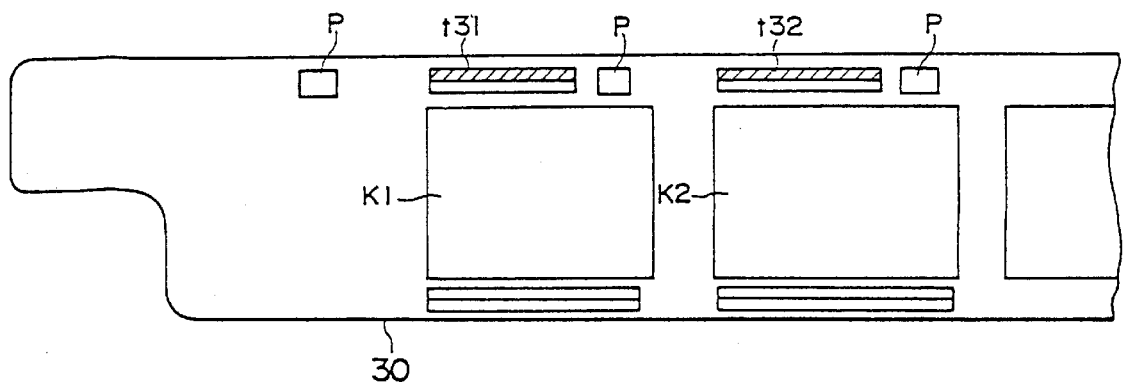
FIG. 10 is a front view showing a recording region of another example of a photographic film according to the third embodiment of the present invention.

The film information (the information obtained upon reading, by the above-mentioned camera, the film information recorded at the leading end of the film) is recorded on magnetic recording tracks t31 and t32 at side edge portions of a photographic film 30 similar to the film of the Embodiment 1 (see FIG. 10), the side edge portions being allocated to first and second frames K1 and K2, respectively.

Embodiments 3-5 to 3-8

Figure 11:
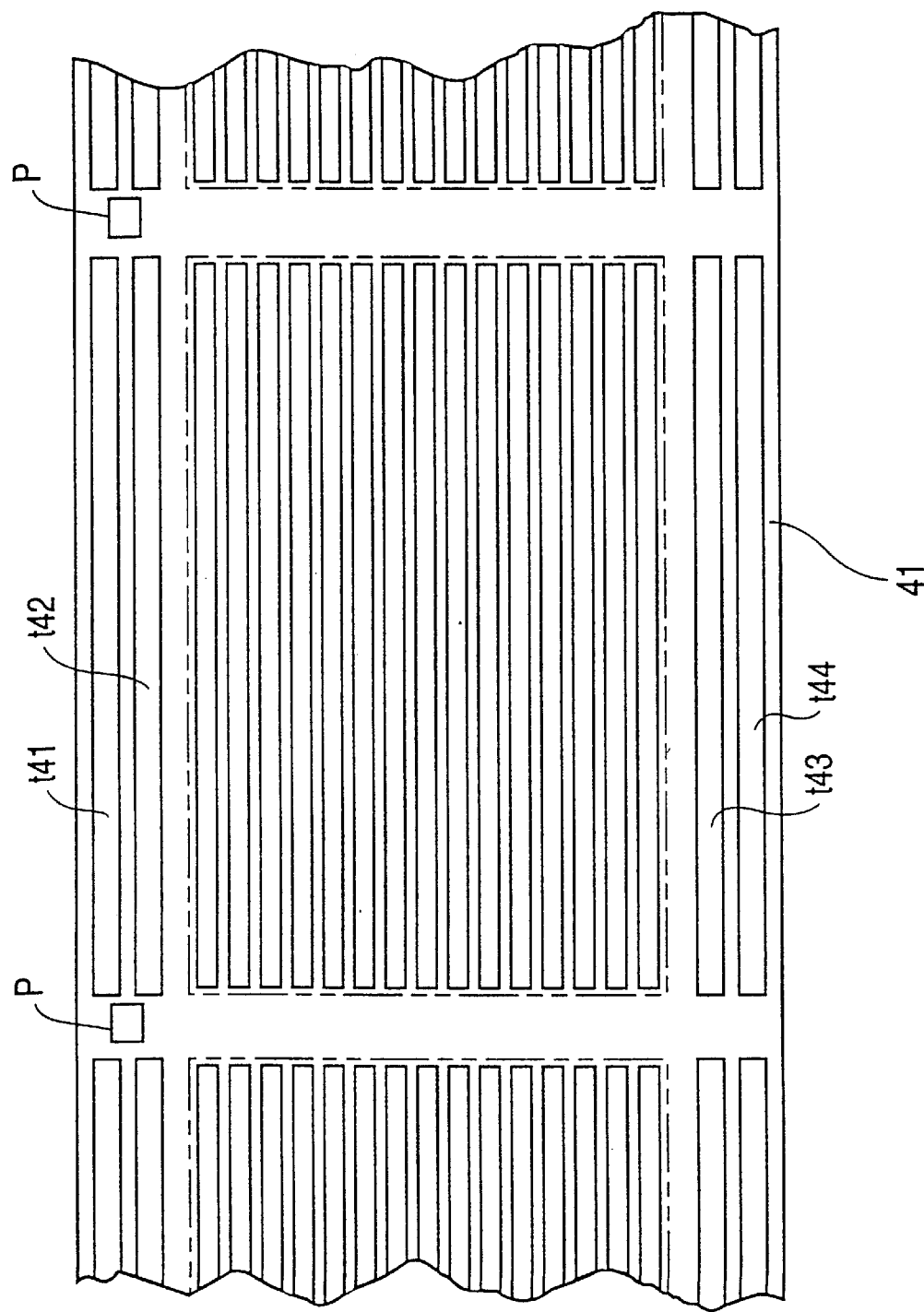
FIG. 11 is a front view showing a recording region of yet another example of a photographic film according to the third embodiment of the present invention.

A photographic film 41 is shown which is similar to those of the Embodiments 3-1 to 3-4 except that perforations are provided between adjacent frames along the side edge of the film, as shown in FIG. 11. In this figure, t41 to t44 denote magnetic recording tracks and each frame is denoted by a double-dotted chain line.

Fourth Embodiment

Figure 14:
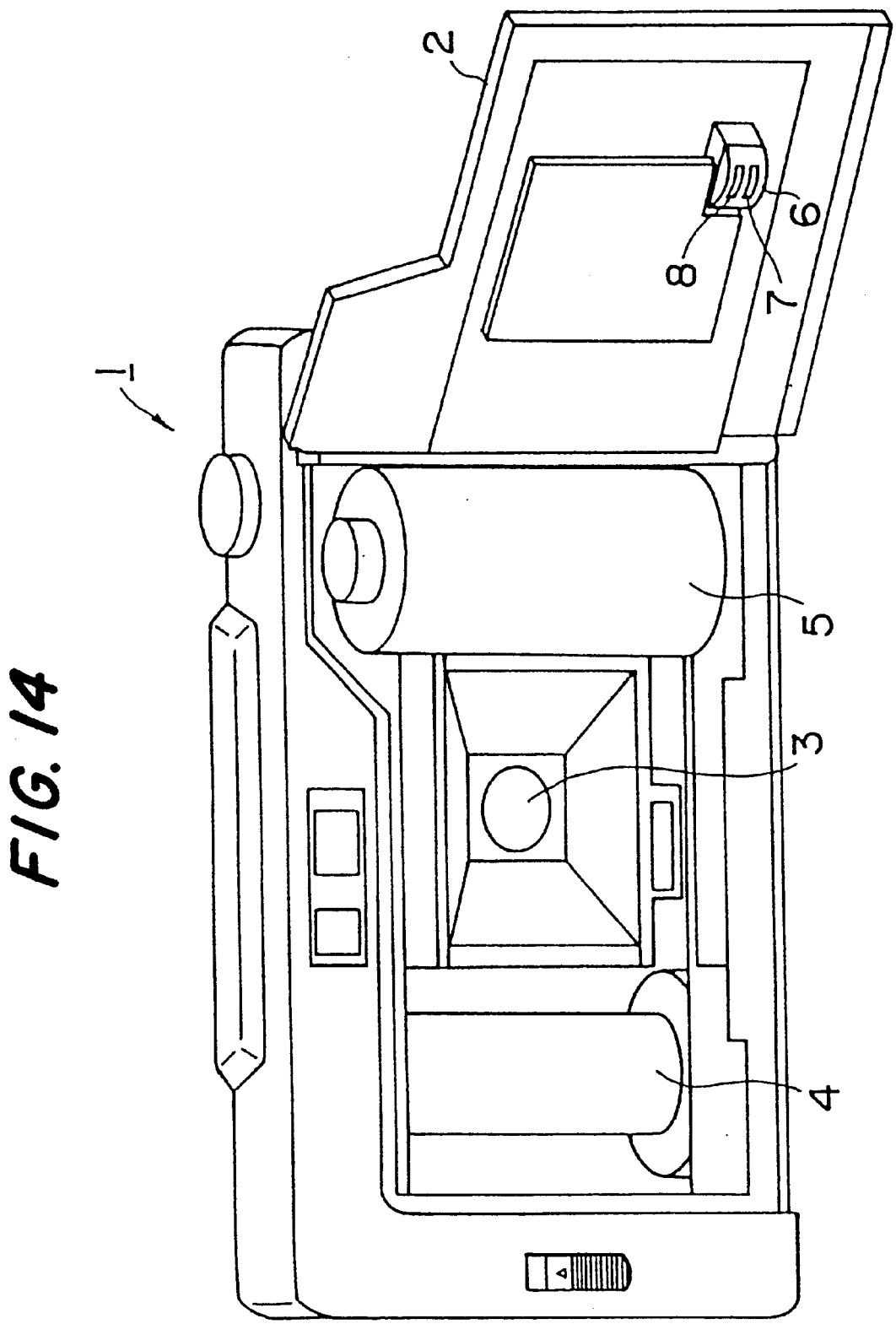

By referring to the drawings, a camera-laboratory system of the present embodiment will be explained in more detail. FIG. 14 shows an overall camera system embodying the present invention, in a schematic perspective view, wherein a rear cover 2 is opened to show its inside. In FIG. 14, the camera system 1 includes, on its both sides at the back of a lens 3, a film takeup spool 4 and a patrone 5 accommodating therein a continuous film. The continuous film is designed to be moved in both (takeup and reverse) directions between the patrone 5 and the film takeup spool 4 which are rotationally driven by electric motors, not shown.

The continuous film is coated with a photosensitive layer containing a photosensitive material on its one surface facing the lens 3 and with a transparent magnetic layer containing a magnetic material on its other surface. A protective layer is additionally formed on the upper surface of the transparent magnetic layer. On the rear cover 2 is mounted a magnetic head 6 having electromagnetic transducer elements 7, 8 which are provided at positions capable of writing or reading magnetic recordings from or on the continuous film upon closure of the rear cover 2.

Figure 15:
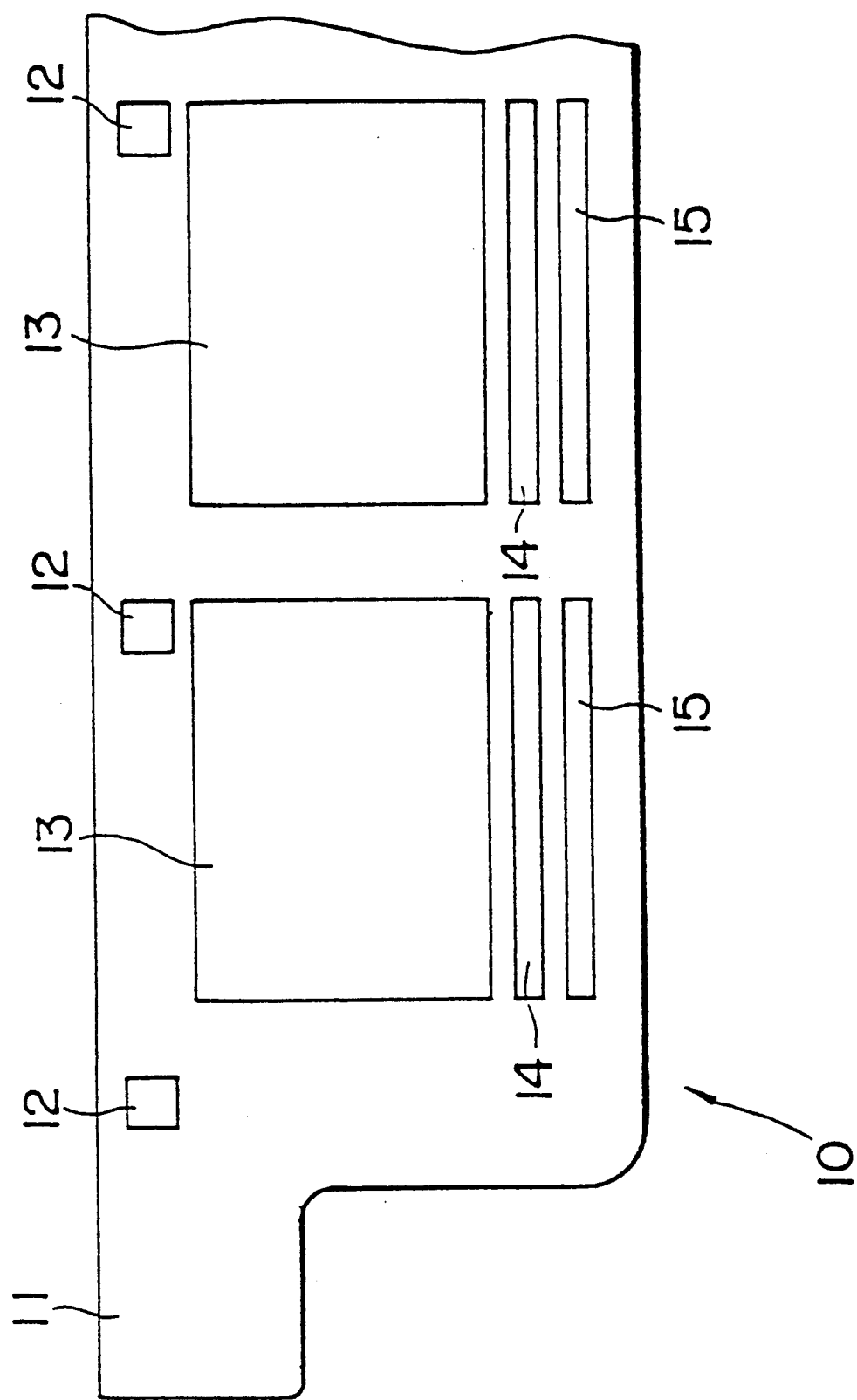

FIG. 15 shows, in a plan view, a continuous photographic film for illustrating the track disposition for magnetic recordings on the film simultaneously with image areas (frames). In FIG. 15, only two frames 13 close to a lead part 11 of the continuous film 10 are shown. Film transport apertures 12, known as perforations, are provided in the continuous film 10 at a rate of one for each frame 13 in the vicinity of the upper rear end of the associated frame. One more film transport aperture 12 is provided in the vicinity of the lead part 11. Two tracks 14, 15 for magnetic recording are provided for each frame 13 in two lines below the associated frame. As for the magnetic recording writing or reading is carried out through electromagnetic transducers 7, 8 of the magnetic head 6 on the tracks 14, 15, respectively.

FIG. 16 is a signal waveform diagram at the magnetic head 6 for the magnetic recordings made on the tracks 14 and 15. The rectangular pulse signal shown in FIG. 3 includes both clock signals and a data signal. More specifically, a rising flank P1A of a pulse and a rising flank P2A of a succeeding pulse correspond to clock signals, while a falling flank P1B of the first pulse corresponds to a data signal.

Figure 16A:
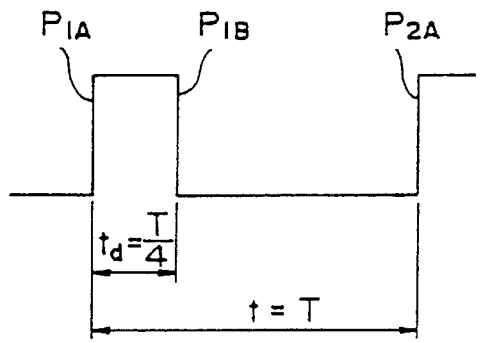
FIGS. 16a and 16b are a signal waveform diagram showing the waveform of a signal to be recorded by a magnetic head in the camera system of FIG. 14.
Figure 16B:
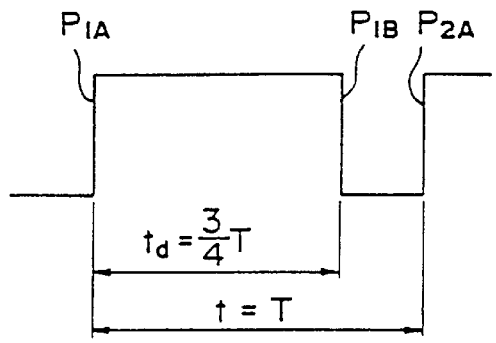
Figure 17A:
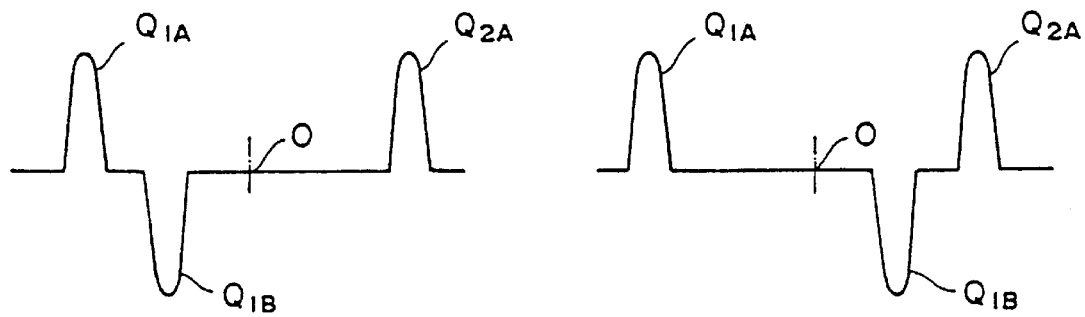
FIGS. 17a and 17b a waveform diagram showing the waveform of signals reproduced from the magnetic recordings made by the signal shown in FIG. 16.
Figure 17B:
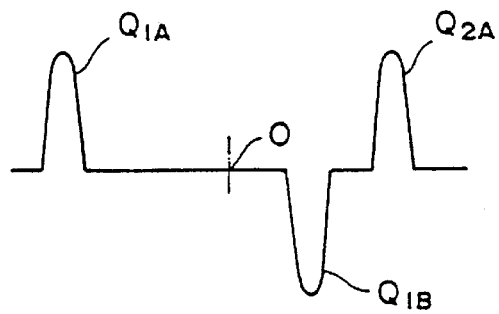

FIG. 16a shows the waveform of a logical level "0" of a binary signal. In this case, a pulse width td is given by T/4, where T denotes a pulse period. FIG. 3b shows the the waveform of a logical level "1" of a binary signal. In this case, a pulse width td is given by td=3T/4, where T denotes the pulse period as above. FIGS. 17a and 17b are waveform diagrams for signals reproduced from magnetic recordings made by the signals shown in FIGS. 16a and 16b. FIG. 17a shows a case in which the reproduced binary signal has a logical level of "0". The negative pulse Q1B, corresponding to the data signal, is lagging by T/4 behind to the preceding positive peak pulse Q1A as the clock signal, while leading by 3 T/4 with respect to the succeeding positive peak pulse Q2A. FIG. 17b shows a case in which the reproduced binary signal has a logical level "1". In a manner different from the case shown in FIG. 4a, the negative peak pulse Q1B, corresponding to a data signal, is lagging by 3 T/4 behind the preceding positive peak pulse Q1A, while leading by T/4 with respect to the succeeding positive peak pulse Q2A. As a consequence, the negative peak pulse Q1B is situated centrally between a center time point O between neighboring positive peak pulse Q1A and Q2A and a closer one of the positive peak pulse Q1A or Q2A. Hence, it is when the positive of the negative peak pulse is deviated by T/4 or more with respect to the central point O between the positive peak pulse that the logical level "0" and "1" are read incorrectly. Thus a sufficient allowance may be provided against fluctuations in the film transport speed as compared with the conventional three-bit encoded data system. In this manner, the risk of signal misreading on the occasion of fluctuations in the film transport speed in the camera system may be diminished.

Magnetic cores of the electro-magnetic transducer elements 7, 8 supported by the magnetic head 6 are constituted by magnetic materials, such as Permally, Sendust of amorphous materials. The coercivity Hc of the magnetic material is selected from values of 600, 750 and 850 Oe. With a medium having these values of coercivity Hc, the magnetic head has characteristics comparable with those of the ordinary audio head. The track width of the magnetic head is of an order of 1 to 2 mm.

Figure 5:
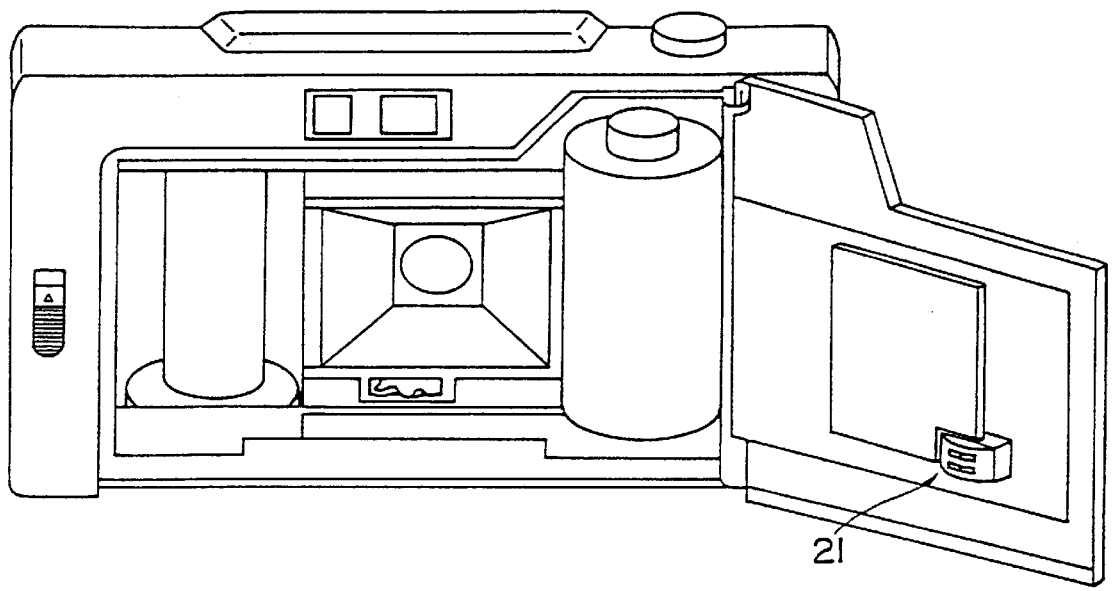
Figure 18:
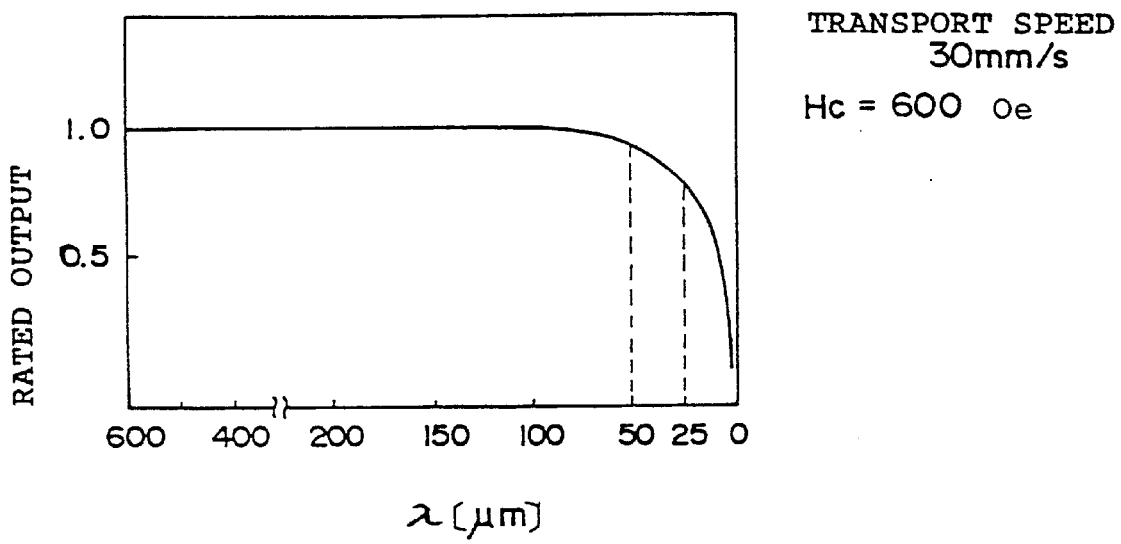

The film transport speed in the camera system is in the order of 30 to 90 mm/s with the use of a winder and in the order of 100 to 300 mm/s with the use of a motor drive. With the film transport speed in the range of 30 to 300 mm/s, the rated output of the magnetic head is as shown in FIG. 18. Although FIG. 5 is plotted for the coercivity Hc of 600 Oe and the film feed speed of 30 mm/s, the frequency-dependent characteristics curves are substantially similar to that shown in FIG. 18 for the coercivity Hc and the film transport speed in the above ranges.

In FIG. 18, the range of the wavelength $\lambda$ of the clock signals, for which the signals reproduced from the clock signals and the data signals become substantially non-dependent on frequency, is 25 $\mu$m or more ($\lambda \geq 25$ $\mu$m) in which case the rated output is 3 dB. Most preferably, the wavelength 80 is 50 $\mu$m or more ($\lambda \geq 50$ $\mu$m). Hence, if the winder is used, and the film transport speed is 90 mm/s, the frequency range $f_{90}$ which may be used as an upper limit is given by $$1/f_{90} \times 90 \text{ mm/s} \geq \lambda$$

so that, with $\lambda=25$ $\mu$m, the frequency range $f_{90}$ is given by $f_{90} \leq 3.6$ kHz 4 kHz. The preferred frequency range $f_{90'}$ is given by $f_{90'} \leq 2$ kHz.

Similarly, if a motor drive is used, and the film transport speed is 300 mm/s, the frequency range $f_{300}$ which may be used as the upper limit is given by $$1/f_{300} \times 300 \text{ mm/s} \geq \lambda$$

so that, with $\lambda=25$ $\mu$m, the frequency range $f_{300}$ is given by $$f_{300} \leq 12 \text{ kHz}.$$

The preferred frequency range $f_{300}$ is given by $$f_{300'} \leq 6 \text{ kHz}.$$

On the other hand, the lower limit frequency of the clock signals is found from the number of bits that may be recorded in a track length of each frame of the film and the number of information bits required of each frame. From the track length of a frame and the required number of the information bits, the wavelength $\lambda$ of the clock signals is calculated to be 0.6 mm or less. Thus the frequency of the clock signals is calculated to be 50 Hz or more and 150 Hz or more for the case of using the winder and the lower film transport speed of 30 mm/s and for the case of using the motor drive and the lower film transport speed of 100 mm/s, respectively.

In sum, the usable frequency range of the clock signals in the camera system is 50 Hz to 4 kHz (or 20 ms to 0.25 ms in terms of the pulse period) and preferably 100 Hz to 2 kHz (or 10 ms to 0.5 ms in terms of the pulse period), with the use a winder, and 150 Hz to 12 kHz (or 6.7 ms to 0.08 ms in terms of the pulse period) and preferably 300 Hz to 6 kHz (or 3.3 ms to 0.16 ms in terms of the pulse period) with the use of a motor drive, respectively.

In the laboratory system, the motor drive is used, with the film transport speed usually being in the range of from 200 mm/s to 500 mm/s. In this case, for the reason similar to that given in the foregoing, the range of the frequency f usable with the clock signals is similarly 300 Hz≦f≦2 kHz (or 3.3 ms to 0.05 ms in terms of the pulse period) and preferably 600 Hz≦f≦16 kHz (or 1.7 ms to 0.1 ms in terms of the pulse period).

By way of giving an example of a signal construction for frame-to-frame magnetic recording in the present camera system, frame number data and data for frame-to-frame photographing date and photographing conditions are recorded in the first track 14 in FIG. 2. Similarly, a signal proper to the owner of the camera, such as a camera code, is recorded on the second track 15. Further track(s) for magnetic recording are occasionally provided in an upper region above or in the main region of the transparent magnetic layer of a film frame 13. On the further track(s), magnetic recordings may be made by the laboratory system or by a magnetic device at the film dealer after the camera user has entrusted them with the film developing operation. In this case, magnetic recordings indicating the data concerning film rating (specifications) may be also made by the film producer on the track(s) provided at the upper region above the frame.

Fifth Embodiment

Figure 19:
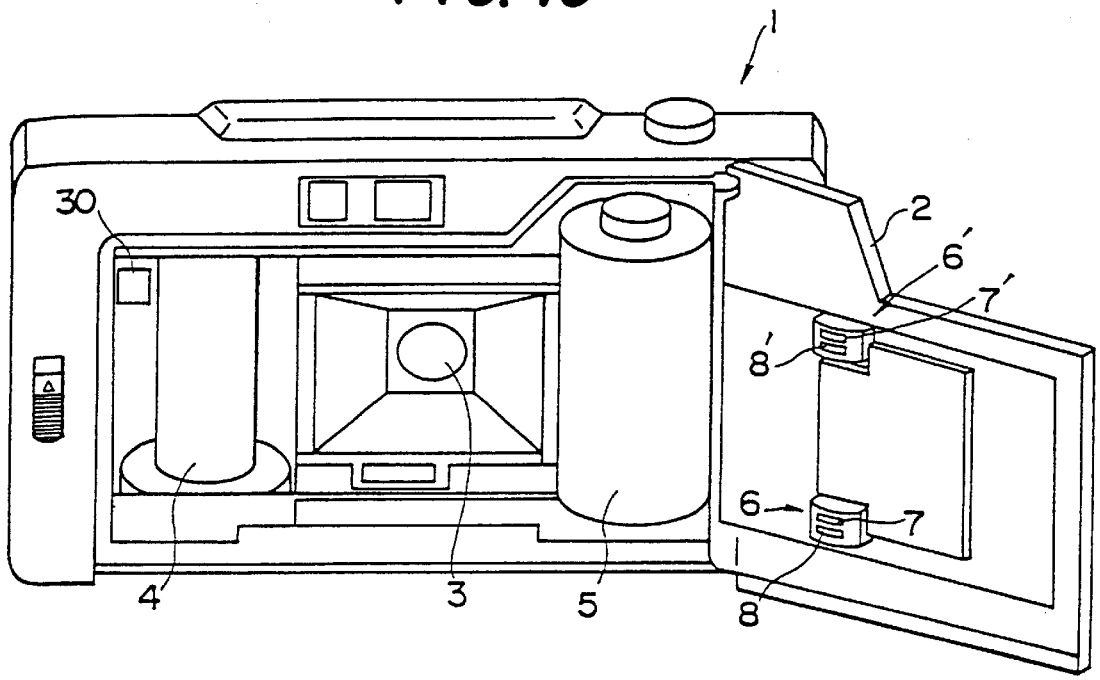

A camera system according to the present embodiment will be explained by referring to the drawings. FIG. 19 shows a camera system 1 according to an embodiment of the present invention, with a rear cover 2 of the camera opened to show its interior. In FIG. 19, the camera system 1 includes, in its inside, a film takeup spool 4 and a patrone 5 accommodating a continuous film therein, which are arranged on both sides and at the back of a lens 3. The continuous film is arranged so as to be moved in either directions between the patrone 5 and the film takeup spool 4 which are adapted to be rotated by electric motors, not shown.

A photosensitive layer, including a photosensitive material, is applied, such as by coating, to one side of the continuous film facing the lens, while a transparent magnetic layer including a magnetic material is applied, such as by coating, on the other side of the continuous film. A protective layer is formed on the upper surface of the transparent magnetic layer. On the rear cover 2, there are supported two magnetic heads 6, 6', provided with electromagnetic transducers 7, 8; 7', 8', respectively, which are so located so as to read and/or write magnetic recordings from or on the continuous film on closure of the rear cover 2. A microprocessor 30 is adapted to control the diaphragm, exposure time etc. of the camera as well as the camera system in its entirety, inclusive of a film transport motor, a magnetic head etc. in a known manner.

Figure 20:
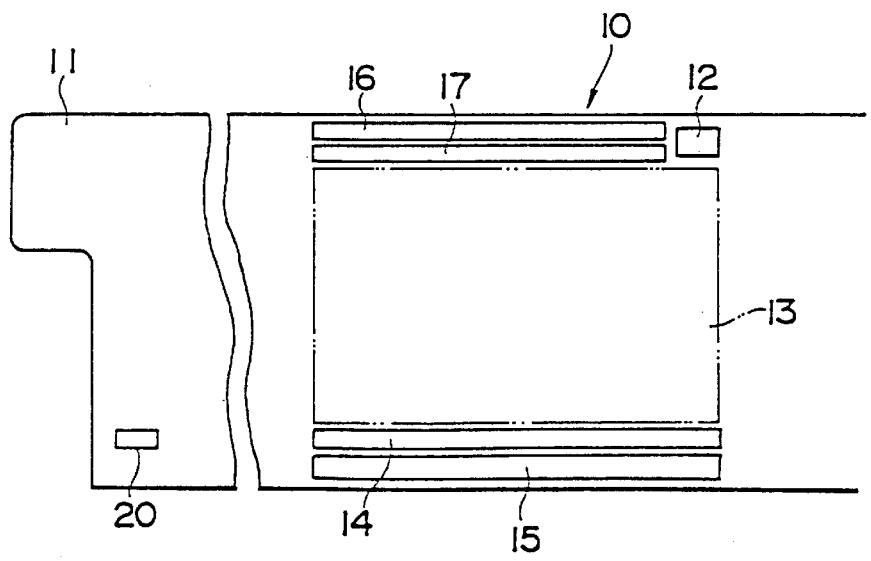

FIG. 20 is a partial plan view of a continuous film for illustrating an array of tracks for magnetic recordings on the continuous film simultaneously with an image area (frame). A transport hole 12 for film transport, also known as a perforation, is formed in the vicinity of an upper rear edge of each frame 13 in the continuous film 10 at a rate of one hole per frame.

Tracks 14 to 17 for magnetic recording are provided for each frame 13, with the tracks 14 and 15 being formed at the lower edge and with the tracks 16 and 17 being formed at the upper edge of the frame 13, respectively. Magnetic recordings are written and/or read on or from the tracks 14 to 17 by the electromagnetic transducer elements 7, 8; 7', 8'of the magnetic heads 6, 6', respectively. An indicating region 20 is provided in the vicinity of a lead part 11 of the film as an extension of the track 14. If the film is magnetically pre-recorded, that effect is written in the indicating region 20. An indicating region similar to the indicating region 20 is provided at the similar position at the trailing end of the film. In the indicating region 20, there is also recorded data as to if the film is transported in the forward direction or in the reverse direction.

Figure 21:
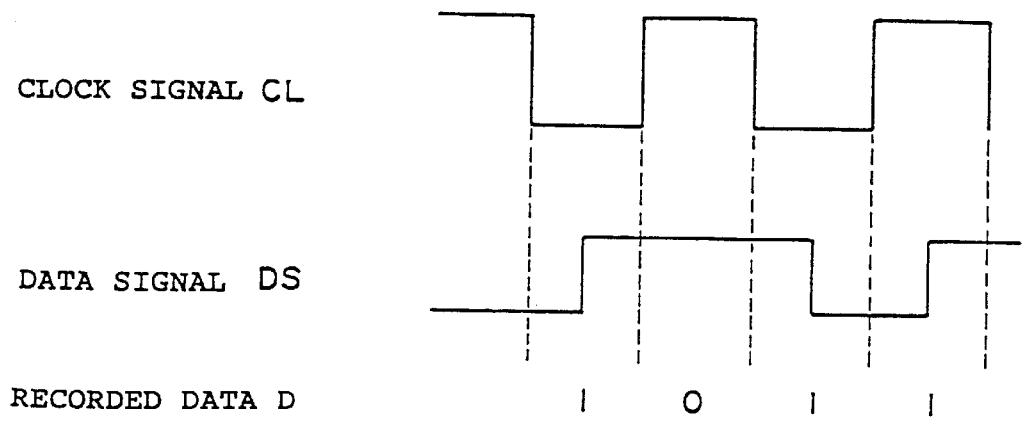
Figure 22:
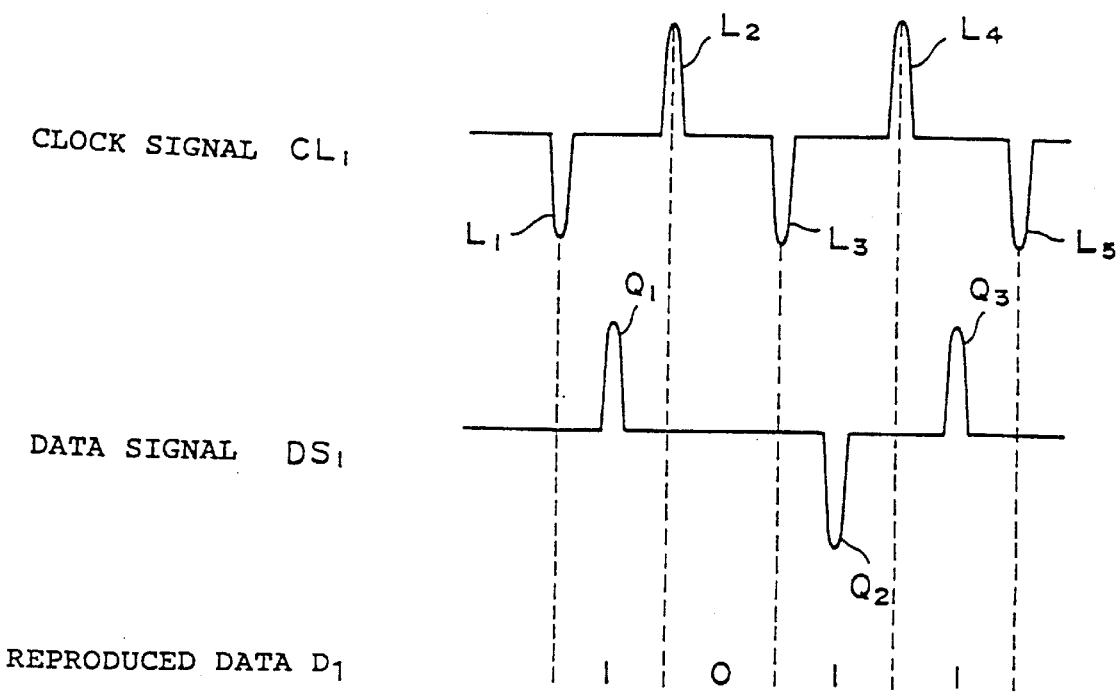

FIG. 21 shows recording signals applied to the magnetic head for writing magnetic signals in the form of binary signals on the continuous film. Recording data D, clock signals C and data signals DS are shown in correspondence. In FIG. 21, data signals DS are outputted once when the clock signal CL assumes either a high level or a low level. Pulse transition occurs when the logical level of the recording data D is "1", so that the data signal DS turns from the high level to the low level or vice versa, i.e., from the low level to the high level. When the logical level of the recording data D is "0", no level transition of the data signal DS occurs. FIG. 22 shows the waveform of reproduced signals which are obtained when the magnetic signals written on the tracks 14 and 15 by recording signals having the waveforms of the clock signals and the data signals shown in FIG. 21 are reproduced by the magnetic head 6. In FIG. 22, the data signals are read between the peak pulses L1 to L5 corresponding to the clock signals. If peak pulses Q1, Q2 and Q3 are present in the data signal between the peak pulses of the clock signals, the logical level is determined to be "1" and, if otherwise, the logical level is determined to be "0", so that reproduced data D1 as shown in FIG. 22 are produced.

The operation of the camera system of the present embodiment will be explained by referring again to FIGS. 19 and 20. When the continuous film 10 is loaded in the camera system, continuous film 10 is first read by the magnetic head 6 whether or not formatted magnetic signals are pre-recorded in the indicating region 20 of the lead part 11 of the continuous film 10, and also whether or not the film transport direction is the forward direction. If the continuous film 10 is a new one on which formatted signals are not recorded, the camera system 1, while prewinding the continuous film 10 by transporting the continuous film 10 from the patrone 5 to the film takeup spool 4, records clock signals on the first track 14, as well as the camera code and the frame numbers on the second track 15 by electromagnetic transducer elements 7 and 8 of the magnetic head 6, respectively, for formatting. Data on the second track 15 are naturally synchronized at this time with the clock signals. If a signal indicative of the formatted state is pre-recorded on the indicating region 20, only prewinding is performed. By pre-recording the clock signals in this manner, subsequent signal transmission between different systems with different film speeds become possible, while accurate signal recording and reproduction may be made despite fluctuations occasionally in the film transport speed in the same system.

In the course of initial formatting with concurrent prewinding, the microprocessor 30 calculates the film transport speed based on the detected position of the transport hole 12 for film transport or from the number of revolutions of a film transport motor. Based on the calculated film transport speed, the microprocessor 30 causes the frequency of the clock signals to be changed in accordance, with the calculated film transport speed, while controlling the clock frequency so that each frame-by-frame recording region is located for each frame within a predetermined length during magnetic recording. For photographing each frame, the film is transported in reverse, that is from the takeup spool 4 to the patrone 5. The microprocessor 30 confirms, based on the indication in the indicating region 20, that the film transport direction is the reverse direction and that initial formatting has been completed and the film is ready for photographing. When, after photographing one frame, the film is taken up on the patrone 5, photographing data, such as data concerning the data and time of photographing, lens stop value, shutter speed, zoom data, etc. are recorded by the electromagnetic transducers 7', 8' of the magnetic head 6 provided adjacent to the upper edge of the film on the third and fourth tracks 16, 17 on the film. Data concerning the place of photographing and the photographed object etc. may also be recorded in accordance with data entered via a keyboard removably connected to the camera system by an accessory cable. These signals may be outputted as letters or characters on the film developed at the laboratory system.

Depending on the selected frame number inputted by the photographer, a frame bearing a desired frame number on the continuous film may be transported to a light exposure position by the lens for photographing at the selected frame position. Alternatively, depending on another selected input manner, one or more frames may be skipped for skip recording. It is possible in such a case to take up the continuous film in the patrone 5 with one or more frames remaining unexposed and to transfer the film from the camera to another camera to effect photographing of the unexposed frame or frames by another camera system. In contrast to the conventional system in which a given continuous film need to be exposed to light in its entirety by a sole camera, only the film having one or more frames exposed to light may be handed over to another person who performs photographing on the film at another place by another camera, so that waste otherwise caused by photographing on unnecessary frame or frames for convenience in developing may be eliminated. The risk of double light exposure is not caused because rephotographing on the photographed frames is inhibited by the presence of the magnetic recording on each frame.

At a film dealer or developing laboratory, desired data recorded by the camera system are read out in synchronism with clocks recorded on the first track 14. These data may be used for setting of developing or printing conditions, grasping customer data, or for requesting printing only of preselected frames. It is also possible with the film dealer or developing laboratory to record data necessary by the dealer or developing laboratory in the photographed frames on the film. In this case, magnetic recording is made on the transparent magnetic layer on the entire film surface except those portions on which magnetic signals have been recorded, for example, within the frame area. Although the upper two and the lower two tracks on both sides of each frame are reserved in the present embodiment for magnetic recording which should be made by the camera system, the number of tracks may naturally be selected in any desired manner. For example, only two lower tracks may be provided so that clock signals are recorded on one of the tracks and data are recorded on the other track. Alternatively, three tracks may be provided on the side edge of the film devoid of perforation(s) so that clock signals are recorded on one of the tracks and data are recorded on the other tracks.

Although the perforation 12 is provided in the present embodiment at the upper rear end of each frame, the perforation may be provided at the intermediate region of each frame, or the perforation may be eliminated so that the recording track at the upper side edge of the frame has a length equal to the frame length, in which case a track at the upper side of the frame may be used as a track for initial formatting for a new film.

Meritorious Effects of the Invention

The meritorious effects of the present invention in the first to fifth embodiments thereof are summarized as follows.

Meritorious Effects of the Embodiment of the Invention

With the photographic film, on which magnetic recording may also be made, according to the first embodiment of the present invention, the magnetic recording region(s) at the film side edge(s) per photosensitive image area is increased in area and the magnetic recording track at the side edge of the film is rendered continuous and of a sufficient length because each of the perforations is provided between the adjacent photosensitive image areas in at least a side edge of the film in a side edge region lying between the photosensitive image areas and the perforation extends throughout the overall length of the side edge region of the film adjacent to the image area in at least one side edge of the film.

With the recording methods for a photographic film, on which magnetic recording may also be made, information may be recorded by using this photographic film.

Meritorious Effects of the Second Embodiment of the Invention

With the recording method for a magnetically recordable photographic film and the photographic film therefor, information is recorded on the magnetically recordable photographic film having perforations only on one side edge of the film by a magnetic recording unit provided on the camera only on the side edge devoid of the perforations, so that the information may be recorded reliably without the aforementioned problems which might be produced when recording is made on the side edge of the film provided with the perforations, such as wear to the head or fluctuations in the feed speed.

By rewriting the information, once recorded on the film within the camera, with the aid of the recording system of the present embodiment, the camera information recorded on the film under unstable states may be converted into and recorded as reliable and stable magnetically recorded information, thereby enabling the information to be re-read subsequently, above all, after development or after printing, with improved reliability, for accurately reproducing the information. On the other hand the load on the mechanism of the reading device may be relieved during re-reading.

Meritorious Effects of the Third Embodiment of the Invention

According to the first sub-embodiment of the second embodiment, the film information can be recorded efficiently. First, when using a new film, the most crucial film information may be reliably and promptly read at the start of film take-up on loading the film in the camera. Also, after loading the film in the camera, the film in its entirety can be taken up, and the film information may be recorded at desired positions at a desired number of repetitions. In addition, since the film information may be recorded a desired number of times at succeeding film portions based on the information read out at the leading end portion of the film, the film information, recorded at locations other than the leading end portion, may occasionally be read frame by frame for photographing as the film information is checked.

According to the second sub-embodiment of the second embodiment, a sufficient amount of the film information is recorded at the leading end portion of the film which may be used as a spare recording region for other information. Since the same film information may be recorded a desired number of times, reading errors of the film information may be prevented from occurring. The advantage to be acquired by recording the film information at the longitudinal leading end of the film has been discussed in connection with the first sub-embodiment of the second embodiment.

According to the third sub-embodiment of the second embodiment, photographing may be made as the film information is read frame by frame to check the film information. Also, photographing may be started at a desired frame of the film thereupon to prevent misreading of the film information.

According to the fourth sub-embodiment of the second embodiment, since the film information may be read two or more times at different film locations, photographing may be made as the film information is checked to prevent misreading of the film information. Meanwhile recording of the film information at or in the vicinity of the longitudinal leading end of the photographic film would be most effective.

Meritorious Effects of the Fourth Embodiment of the Invention

With the above described camera system of the present invention, by setting the relation between the pulse period t and the pulse width td in a pulse train so as to be 0<td/t≦1/4 or 3/4≦td/t<1, there is provided a camera system in which signal errors are less likely to be produced despite fluctuations occasionally in the film transport speed.

In addition, by prescribing the frequency range of the clock signals in accordance with the film transport speed in the camera-laboratory system or magnetic head characteristics, there may be provided a camera-laboratory system in which signal recording/reproduction may be made in accordance with satisfactory frequency characteristics and in which the number of bits necessary for each frame may be procured and maintained easily.

Meritorious Effects of the Fifth Embodiment of the Invention

From the foregoing, it is seen that the present invention provides a camera system in which prescribed magnetic signals may be recorded on a new continuous film, simultaneously with prewinding, when the film is loaded, so that initial film formatting becomes possible. As a result of which, data such as those for photographing conditions and data to be recorded during prewinding of the film may be recorded separately for reducing the volume of data to be recorded after light exposure, and in which the film may be transported at an appropriate transport speed for the camera system while a predetermined constant recording density is maintained within the range of performance of various devices provided in the camera system, such as a microprocessor, buffer, or a magnetic system.

If frame number data to be recorded for each frame are included in the magnetic signals, photographing may be made on an arbitrarily selected frame so that the film may be transferred from one camera to another for photographing which eliminates film loss and consequent wasteful printing.

If clock signals are included in the magnetic signals, signal transmission between different systems having different film transport speeds, such as a camera system and a laboratory system, becomes possible, while, in addition, in the case of film transport speed fluctuations in a given system, magnetic signals may be recorded and reproduced accurately with a reasonably high recording density.

The invention being thus described, it will be obvious that the same may be varied in many ways. Such variations are not to be regarded as a departure from the sprit and scope of the invention, and all such modifications as would be obvious to one skilled in the art are intended to be included within the scope of the following claims.

What is claimed is:

1. A camera system for recording on a magnetically recordable photographic film having a film base, a photosensitive layer, and a magnetically recordable transparent magnetic layer, the camera system comprising:

first recording means for recording images in image frames in the photosensitive layer of the magnetically recordable photographic film, the magnetically recordable photographic film also having a plurality of perforations disposed along a side edge region, single respective perforations lying between adjacent ones of a series of the image frames along the side edge region of the magnetically recordable photographic film; and second recording means for magnetically recording information on a magnetic recording track extending throughout an overall length of an image frame along the side edge region of the magnetically recordable photographic film between corresponding pairs of perforations.

2. The camera system of claim 1, wherein said second recording means magnetically records information on additional plural magnetic recording tracks each extending throughout an overall length of a corresponding image frame along the side edge region of the magnetically recordable photographic film between corresponding pairs of the perforations.

3. The camera system of claim 2, wherein the side edge region is disposed along a first side edge of the magnetically recordable photographic film, said second recording means magnetically recording information on further plural magnetic tracks each extending throughout an overall length of a corresponding image frame along a second side edge of the magnetically recordable photographic film which is opposite the first side edge.

4. The camera system of recording of claim 1, wherein said first recording means records images in image frames of the magnetically recordable photographic film having the side edge region disposed along a first side edge of the magnetically recordable photographic film such that the plurality of perforations are disposed only along the first side edge of the film.

5. The camera system of claim 1, wherein said first recording means records images in image frames of the magnetically recordable photographic film having the side edge region disposed along a first side edge of the magnetically recordable photographic film and an additional side edge region disposed along a second side edge of the magnetically recordable photographic film opposite the first side edge, the plurality of perforations being disposed along both the first and second side edge regions.

6. A camera system for a magnetically recordable photographic film having a magnetically recordable transparent magnetic layer, the camera system comprising:

recording means for magnetically recording film information on a longitudinal leading end portion of the magnetically recordable photographic film; and reading means for reading the film information recorded in the longitudinal leading end portion of the magnetically recordable photographic film, said recording means magnetically recording the read film information in a recording track of the magnetically recordable photographic film separate from the longitudinal leading end portion.

7. The camera system of claim 6, wherein the longitudinal leading end portion is a lead part of the magnetically recordable photographic film.

8. The camera system of claim 6, wherein said magnetic recording means records the read film information in plural recording tracks separate from the longitudinal leading end portion.

9. The camera system of claim 6, further comprising exposing means for exposing photosensitive image areas of the magnetically recordable photographic film, said recording means recording the read film information in a different respective recording track for each exposed photosensitive image area.

10. The camera system of claim 6, wherein the film information comprises film sensitivity, number of frames, film type, day of production, time limit of use and production number.

* * * * *